(12) United States Patent
Teraoka

(10) Patent No.: US 11,914,123 B2
(45) Date of Patent: Feb. 27, 2024

(54) ZOOM LENS

(71) Applicant: AAC Optics (Changzhou) Co., Ltd., Changzhou (CN)

(72) Inventor: Hiroyuki Teraoka, Osaka (JP)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 140 days.

(21) Appl. No.: 17/566,729

(22) Filed: Dec. 31, 2021

(65) Prior Publication Data
US 2022/0317426 A1    Oct. 6, 2022

(30) Foreign Application Priority Data

Mar. 30, 2021   (JP) .................................. 2021-058866

(51) Int. Cl.
*G02B 15/14*    (2006.01)
*G02B 13/00*    (2006.01)

(52) U.S. Cl.
CPC . *G02B 15/144507* (2019.08); *G02B 13/0045* (2013.01)

(58) Field of Classification Search
CPC ........ G02B 15/144507; G02B 13/0045; G02B 13/009; G02B 13/0015; G02B 15/177; G02B 13/04; G02B 13/06; G02B 13/08; G02B 13/22; G02B 15/04; G02B 15/06; G02B 15/08; G02B 15/1465; G02B 15/163; G02B 15/145519; G02B 15/14; G02B 13/00; G02B 13/18; G02B 15/145113

USPC ....... 359/691, 649, 658, 663, 668, 670, 676, 359/682, 713, 752

See application file for complete search history.

(56) References Cited

U.S. PATENT DOCUMENTS

| | | | | |
|---|---|---|---|---|
| 8,289,632 | B2* | 10/2012 | Ohata | G02B 13/18 359/782 |
| 9,274,326 | B2* | 3/2016 | Kuzuhara | G02B 15/145511 |
| 2009/0073573 | A1* | 3/2009 | Kanetaka | G02B 15/144515 359/686 |
| 2011/0102660 | A1* | 5/2011 | Mihara | G02B 15/144511 348/E5.025 |

* cited by examiner

*Primary Examiner* — Thomas K Pham
*Assistant Examiner* — Kuei-Jen L Edenfield
(74) *Attorney, Agent, or Firm* — W&G Law Group

(57) ABSTRACT

The present disclosure relates to a technical field of optical lenses, and discloses a zoom lens. The zoom lens, being sequentially from an object side to an image side, includes a first lens having a negative refractive power, a second lens group having a positive refractive power, a fifth lens having a positive refractive power, and a sixth lens having a negative refractive power, when zooming, among the first lens, the second lens group, the fifth lens, and the sixth lens, a spacing in an optical axis direction of adjacent lenses or lens groups changes, the second lens group includes a second lens having a positive refractive power, a third lens having a negative refractive power, and a fourth lens having a negative positive power. During photographing, when an F number (FNO) of a wide-angle end is less than or equal to 2.0, the zoom lens becomes bright.

8 Claims, 10 Drawing Sheets

ZOOM LENS

TECHNICAL FIELD

The present disclosure relates to the field of zoom lens having a flexible structure, and in particular to a zoom lens suitable for mobile phone camera lens assemblies and digital cameras, which are composed of camera components having high pixels, such as CCD and CMOS. During photographing, when an F number (FNO) of a wide-angle end is less than or equal to 2.0, the zoom lens becomes bright and has good optical performance. A zoom ratio of the zoom lens is greater than or equal to 1.80, and the zoom lens is composed of four lens groups including six lenses.

BACKGROUND

In recent years, there is a zoom lens being sought, the zoom lens has a wide-angle end having an F number (FNO) less than or equal to 2.0 and further has a zoom ratio greater than or equal to 1.80, which has good optical performance. The zoom lens shortens a total optical length (TTL) through making a lens barrel accommodate in a camera during non-photography and the zoom lens becomes mini when the zoom lens is accommodated in the camera.

A technical development of a zoom lens composed of six lenses is being advanced. As the zoom lens having a six-piece structure, US public application No. US2020/0241265A1 (LEE et al. hereafter) discloses a zoom lens composed of three lens groups including six lenses.

LEE et al. disclose the zoom lens having a zoom ratio which is greater than 4.74. However, when an FNO of a wide-angle end is greater than 2.552, brightness is insufficient, and a TTL is relatively long when photographing, and miniaturization of which is also not sufficient.

SUMMARY

The present disclosure aims to provide a zoom lens, the zoom lens shortens a total optical length (TTL) through making a lens barrel accommodate in a camera during non-photography, when TTL is less than or equal to 8.00 mm, the zoom lens becomes miniature. During photographing, when an F number (FNO) of a wide-angle end is less than or equal to 2.0, the zoom lens becomes bright and has good optical performance. A zoom ratio of the zoom lens is greater than or equal to 1.80, and the zoom lens is composed of four lens groups including six lenses.

In order to achieve above objects, the inventor of the present disclosure studies a ratio of an on-axis distance from an image side surface of the first lens to an object side surface of the second lens in a wide-angle end to an on-axis distance from the image side surface of the first lens to the object side surface of the second lens in a telephoto end, and a ratio of an on-axis distance of an image side surface of the fifth lens to an object side surface of the sixth lens in the wide-angle end to an on-axis distance of the image side surface of the fifth lens to the object side surface of the sixth lens in the telephoto end, and the inventor finally obtains a zoom lens to solve present technical problems of the field of the zoom lens, and further obtains the present disclosure.

In order to achieve the above objects, embodiments of the present disclosure provide a zoom lens. The zoom lens, being sequentially from an object side to an image side, includes a first lens having a negative refractive power, a second lens group having a positive refractive power, a fifth lens having a positive refractive power, and a sixth lens having a negative refractive power, when zooming, among the first lens, the second lens group, the fifth lens, and the sixth lens, a spacing in an optical axis direction of adjacent lenses or lens groups changes, the second lens group includes a second lens having a positive refractive power, a third lens having a negative refractive power, and a fourth lens having a negative positive power.

As an improvement, a focal length of the zoom lens in a wide-angle end is denoted as f_Wide, a focal length of the zoom lens in a telephoto end is denoted as f_Tele, an on-axis distance from an image side surface of the first lens to an object side of the second lens, in the wide-angle end, is denoted as D12_Wide, an on-axis distance from the image side surface of the first lens to the object side surface of the second lens, in the telephoto end, is denoted as D12_Tele, an on-axis distance from an image side surface of the fifth lens to an object side surface of the sixth lens, in the wide-angle end, is denoted as d11_Wide, an on-axis distance from the image side surface of the fifth lens to the object side surface of the sixth lens, in the telephoto end, is denoted as d11_Tele, and the zoom lens satisfies following relationships (1)~(3):

$$f\_Tele/f\_Wide \geq 1.80 \quad (1);$$

$$40.00 \leq D12\_Wide/D12\_Tele \leq 48.00 \quad (2);$$

$$2.00 \leq d11\_Wide/d11\_Tele \leq 2.60 \quad (3).$$

As an improvement, an on-axis distance from an image side surface of the fourth lens to an object side surface of the fifth lens, in the wide-angle end, is denoted as d9_Wide, an on-axis distance from the image side surface of the fourth lens to the object side surface of the fifth lens, in the telephoto end, is denoted as d9_Tele, and the zoom lens satisfies a following relationship (4):

$$0.30 \leq d9\_Wide/d9\_Tele \leq 0.36 \quad (4).$$

As an improvement, a focal length of the first lens is denoted f1, a combined focal lens of the second lens group is denoted as fG2, and the zoom lens satisfies a following relationship (5):

$$-1.30 \leq f1/fG2 \leq -1.00 \quad (5).$$

As an improvement, a focal length of the second lens is denoted as f2, a focal length of the third lens is denoted as f3, and the zoom satisfies a following relationship (6):

$$-1.75 \leq f3/f2 \leq -1.35 \quad (6).$$

As an improvement, a focal length of the second lens is denoted as f2, a focal length of the fourth lens is denoted as f4, and the zoom lens satisfies a following relationship (7):

$$-1.75 \leq f4/f2 \leq -1.35 \quad (7).$$

As an improvement, a focal length of the fifth lens is denoted as f5, a combined focal length of the second lens group is denoted as fG2, and the zoom lens satisfies a following relationship (8):

$$0.30 \leq f5/fG2 \leq 0.40 \quad (8).$$

As an improvement, a focal length of the sixth lens is denoted as f6, a combined focal length of the second lens group is denoted as fG2, and the zoom lens satisfies a following relationship (9):

$$-1.50 \leq f6/fG2 \leq -1.00 \quad (9).$$

As an improvement, the first lens is made of a glass material.

The beneficial effects of the present disclosure are as follows. The present disclosure provides the zoom lens suitable for mobile phone camera lens assemblies and digital cameras, which are composed of camera components having high pixels, such as CCD and CMOS. The zoom lens shortens the TTL through making the lens barrel accommodate into the camera during non-photography, when the TTL is less than or equal to 8.00 mm, the zoom lens becomes miniature. During photographing, when the FNO of the wide-angle end is less than or equal to 2.0, the zoom lens becomes bright and has good optical performance. The zoom ratio of the zoom lens is greater than or equal to 1.80, and the zoom lens is composed of four lens groups including six lenses.

DETAILED DESCRIPTION OF EMBODIMENTS

Figure 1:
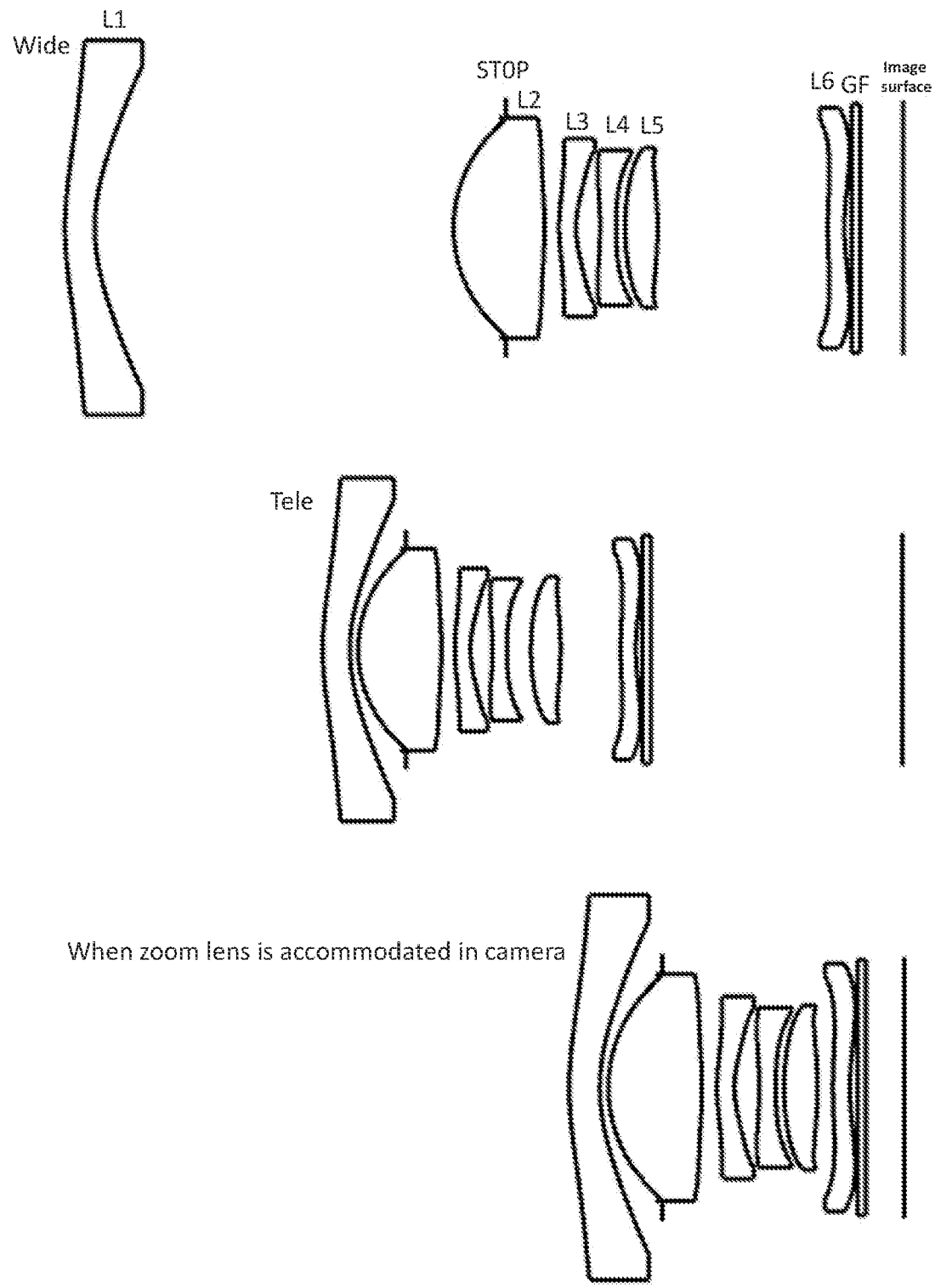
FIG. 1 is a schematic diagram of a structure of a zoom lens LA according to a first embodiment of the present disclosure.

In order to make objects, technical solutions, and advantages of the present disclosure clearer, embodiments of the present disclosure are described in detail with reference to accompanying drawings in following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiments of a zoom lens LA of the present disclosure are described below. The zoom lens LA is composed of four lens groups including six lenses. The zoom lens LA, being sequentially from an object side to an image side, includes a first lens L1, a second lens group G2, a fifth lens L5, and a sixth lens L6. The second lens group G2 includes a second lens L2, a third lens L3, and a fourth lens L4. A glass plate GF is disposed between the sixth lens L6 and an image surface. The glass plate GF may include a glass cover plate and various filters, etc. In the present disclosure, the glass plate GF may be configured at different positions, or a structure of the glass plate GF may be omitted.

The first lens has a negative refractive power, the second lens group G2 has a positive refractive power, the fifth lens has a positive refractive power, the sixth lens L6 has a negative refractive. The second lens group G2 is composed of the second lens L2, the third lens L3, and the fourth lens L4. The second lens L2 has a positive refractive power, the third lens L3 has a negative refractive power, and the fourth lens L4 has a negative refractive power. In order to well correct various aberrations, a lens surface of each of the first lens L1, the second lens L2, the third lens L3, the fourth lens L4, the fifth lens L5, and the sixth lens L6 is in an aspheric shape.

The zoom lens LA satisfies a following relationship (1):

$$f\_Tele/f\_Wide \geq 1.80 \qquad (1).$$

The relationship (1) specifies a zoom ratio of the zoom lens LA. When the relationship (1) is satisfied, correction of various aberrations is easily realized, and the zoom ratio becomes large.

The zoom lens further satisfies a following relationship (2):

$$40.00 \leq D12\_Wide/D12\_Tele \leq 48.00 \qquad (2).$$

The relationship (2) specifies a ratio of an on-axis distance D12_Wide from an image side surface S2 of the first lens L1 to an object side surface S3 of the second lens L2 in a wide-angle end to an on-axis distance D12_Tele from the image side surface S2 of the first lens L1 to the object side surface S3 of the second lens L2 in a telephoto end. In a range of the relationship (2), miniaturization is easily achieved when the zoom lens is accommodated in the camera, an F number (FNO) of the wide-angle end is less than or equal to 2.0, and the zoom ratio of the zoom lens is greater than or equal to 1.80, which further correct various aberrations.

The zoom lens LA further satisfies a following relationship (3):

$$2.00 \leq d11\_Wide/d11\_Tele \leq 2.60 \tag{3}$$

The relationship (3) specifies a ratio of an on-axis distance d11_Wide of an image side surface S10 of the fifth lens L5 to an object side surface S11 of the sixth lens L6 in the wide-angle end to an on-axis distance d11_Tele of the image side surface S10 of the fifth lens L5 to the object side surface S11 of the sixth lens L6 in the telephoto end. In a range of the relationship (3), miniaturization is easily achieved when the zoom lens is accommodated in the camera, the FNO of the wide-angle end is less than or equal to 2.0, and the zoom ratio of the zoom lens is greater than or equal to 1.80, which further correct various aberrations.

The zoom lens LA satisfies a following relationship (4):

$$0.30 \leq d9\_Wide/d9\_Tele \leq 0.36 \tag{4}$$

The relationship (4) further specifies a ratio of an on-axis distance d9_Wide of an image side surface S9 of the fourth lens L4 to an object side surface S8 of the fifth lens L5 in the wide-angle end to an on-axis distance of the image side surface S9 of the fourth lens L4 to the object side surface S8 of the fifth lens L5 in the telephoto end. In a range of the relationship (4), miniaturization is easily achieved when the zoom lens is accommodated in the camera, the FNO of the wide-angle end is less than or equal to 2.0, and the zoom ratio of the zoom lens is greater than or equal to 1.80, which further correct various aberrations.

The zoom lens LA further satisfies a following relationship (5):

$$-1.30 \leq f1/fG2 \leq -1.00 \tag{5}$$

The relationship (5) specifies a ratio of a focal length f1 of the first lens L1 to a combined focal lens fG2 of the second lens group G2. In a range of the relationship (5), miniaturization is easily achieved when the zoom lens is accommodated in the camera, the FNO of the wide-angle end is less than or equal to 2.0, and the zoom ratio of the zoom lens is greater than or equal to 1.80, which further correct various aberrations.

The zoom lens LA further satisfies a following relationship (6):

$$-1.75 \leq f3/f2 \leq -1.35 \tag{6}$$

The relationship (6) specifies a ratio of a focal length f3 of the third lens L3 to a focal length f2 of the second lens L2. In a range of the relationship (6), miniaturization is easily achieved when the zoom lens is accommodated in the camera, the FNO of the wide-angle end is less than or equal to 2.0, and the zoom ratio of the zoom lens is greater than or equal to 1.80, which further correct various aberrations.

The zoom lens LA further satisfies a following relationship (7):

$$-1.75 \leq f4/f2 \leq -1.35 \tag{7}$$

The relationship (7) specifies a ratio of a focal length f4 of the fourth lens L4 to the focal length f2 of the second lens L2. In a range of the relationship (7), miniaturization is easily achieved when the zoom lens is accommodated in the camera, the FNO of the wide-angle end is less than or equal to 2.0, and the zoom ratio of the zoom lens is greater than or equal to 1.80, which further correct various aberrations.

The zoom lens LA further satisfies a following relationship (8):

$$0.30 \leq f5/fG2 \leq 0.40 \tag{8}$$

The relationship (8) specifies a ratio of a focal length f5 of the fifth lens L5 to the combined focal lens fG2 of the second lens group G2. In a range of the relationship (8), miniaturization is easily achieved when the zoom lens is accommodated in the camera, the FNO of the wide-angle end is less than or equal to 2.0, and the zoom ratio of the zoom lens is greater than or equal to 1.80, which further correct various aberrations.

The zoom lens LA further satisfies a following relationship (9):

$$-1.50 \leq f6/fG2 \leq -1.00 \tag{9}$$

The relationship (9) specifies a ratio of a focal length f6 of the sixth lens L6 to the combined focal lens fG2 of the second lens group G2. In a range of the relationship (9), miniaturization is easily achieved when the zoom lens is accommodated in the camera. During photographing, when the FNO of the wide-angle end is less than or equal to 2.0, the zoom lens becomes bright and has good optical performance. The zoom ratio of the zoom lens is greater than or equal to 1.80, and the zoom lens is composed of four lens groups including six lenses.

Embodiments

Following examples are used to illustrate the zoom lens LA of the present disclosure. Symbols described in each of the examples are as follows. Units of focal length, on-axis distance, central curvature radius, on-axis thickness, inflection point position, and arrest point position are millimeter (mm).

Where, meanings of various symbols are as follows.

f: a focal length of the zoom lens LA;
f1: a focal length of the first lens L1;
fG2: a combined focal lens of the second lens group G2;
f2: a focal length of the second lens L2;
f3: a focal length of the third lens L3;
f4: a focal length of the fourth lens L4;
f5: a focal length of the fifth lens L5;
F6: a focal length of the sixth lens L6;
FNO: an F number of the camera optical lens and referring to a ratio of an effective focal length of the zoom lens LA to an entrance pupil diameter of the zoom lens LA;
2ω: full angle of view;
STOP: aperture;
R: a central curvature radius of an optical surface;
R1: a curvature radius of the object side surface S1 of the first lens L1;
R2: a curvature radius of the image side surface S2 of the first lens L1;
R3: a curvature radius of the object side surface S3 of the second lens L2;
R4: a curvature radius of the image side surface S4 of the second lens L2;
R5: a curvature radius of the object side surface S5 of the third lens L3;
R6: a curvature radius of the image side surface S6 of the third lens L3;
R7: a curvature radius of the object side surface S7 of the fourth lens L4;
R8: a curvature radius of the image side surface S8 of the fourth lens L4;
R9: a curvature radius of the object side surface S9 of the fifth lens L5;

R10: a curvature radius of the image side surface S10 of the fifth lens L5;

R11: a curvature radius of the object side surface S11 of the sixth lens L6;

R12: a curvature radius of the image side surface S12 of the sixth lens L6;

R13: a curvature radius of an object side surface S13 of the glass plate GF;

R14: a curvature radius of an image side surface S14 of the glass plate GF;

d: an on-axis thickness of a lens, an on-axis distance between lenses;

d1: an on-axis thickness of the first lens L1;

D12: an on-axis distance from the image side surface S2 of the first lens L1 to the object side surface S3 of the second lens L2;

d2: an on-axis distance from the image side surface S2 of the first lens L1 to the aperture STOP;

d3: an on-axis distance from the aperture STOP to the object surface S3 of the second lens L2;

d4: an on-axis thickness of the second lens L2;

d5: an on-axis distance from the image side surface S4 of the second lens L2 to the object side surface S5 of the third lens L3;

d6: an on-axis thickness of the third lens L3;

d7: an on-axis distance from the image side surface S6 of the third lens L3 to the object side surface S7 of the fourth lens L4;

d8: an on-axis thickness of the fourth lens L4;

d9: an on-axis distance from the image side surface S8 of the fourth lens L4 to the object side surface S9 of the fifth lens L5;

d10: an on-axis thickness of the fifth lens L5;

d11: an on-axis distance from the image side surface S10 of the fifth lens L5 to the object side surface S11 of the sixth lens L6;

d12: an on-axis thickness of the sixth lens L6;

d13: an on-axis distance from the image side surface S12 of the sixth lens to the object side surface S13 of the glass plate GF;

d14: an on-axis thickness of the glass plate GF;

d15: an on-axis distance from the image side surface S14 of the glass plate GF to the image surface;

nd: refractive index of a d line;

nd1: refractive index of a d line of the first lens L1;

nd2: refractive index of a d line of the second lens L2;

nd3: refractive index of a d line of the third lens L3;

nd4: refractive index of a d line of the fourth lens L4;

nd5: refractive index of a d line of the fifth lens L5;

nd6: refractive index of a d line of the sixth lens L6;

ndg: refractive index of a d line of the glass plate GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the glass plate GF;

TTL: a total optical length (an on-axis distance from object side surface S1 of the first lens L1 to the image surface);

LB: an on-axis distance from the image side surface S12 of the sixth lens L6 to the image surface;

IH: image height.

Embodiment 1

FIG. 1 is a schematic diagram of a structure of a zoom lens LA according to a first embodiment of the present disclosure. Table 1 shows date of curvature radius R, on-axis thickness and on-axis distance d, refractive index nd, and abbe number vd of each of the lenses. Table 2 shows a corresponding value of A to D respectively during photographing and the zoom lens is accommodated in the camera. Table 3 shows a conic coefficient k and aspheric surface coefficient. Table 4 shows the data of FNO, 2ω, f, TTL, LB, f1, fG2, f2, f3, f4, f5, f6, IH, and zoom ratio.

TABLE 1

| | | R | | d | | nd | | vd | Effective radius (mm) |
|---|---|---|---|---|---|---|---|---|---|
| S1 | R1 | 7.67105 | d1 | 0.719 | nd1 | 1.5264 | v1 | 76.860 | 4.535 |
| S2 | R2 | 4.27375 | D12 d2 | A | | | | | 3.923 |
| Stop | | ∞ | d3 | −1.261 | | | | | 2.667 |
| S3 | R3 | 3.31060 | d4 | 2.201 | nd2 | 1.5438 | v2 | 56.029 | 2.670 |
| S4 | R4 | −10.44730 | d5 | 0.353 | | | | | 2.504 |
| S5 | R5 | 4.55214 | d6 | 0.411 | nd3 | 1.6153 | v3 | 25.936 | 2.154 |
| S6 | R6 | 2.35630 | d7 | 0.583 | | | | | 1.890 |
| S7 | R7 | −8.09266 | d8 | 0.386 | nd4 | 1.6700 | v4 | 19.392 | 1.878 |
| S8 | R8 | 11.80297 | d9 | B | | | | | 1.845 |
| S9 | R9 | 7.55688 | d10 | 0.783 | nd5 | 1.6153 | v5 | 25.936 | 1.935 |
| S10 | R10 | −7.66352 | d11 | C | | | | | 1.906 |
| S11 | R11 | 10.46885 | d12 | 0.400 | nd6 | 1.5346 | v6 | 55.695 | 2.633 |
| S12 | R12 | 5.67503 | d13 | 0.173 | | | | | 2.909 |
| S13 | R13 | ∞ | d14 | 0.210 | ndg | 1.5168 | vg | 64.167 | 2.974 |
| S14 | R14 | ∞ | d15 | D | | | | | 3.010 |

Wavelength for reference: 587.6 nm

TABLE 2

| | When photographing | | When the zoom lens |
|---|---|---|---|
| | Wide | Tele | is accommodated |
| A | 9.953 | 1.478 | 1.461 |
| B | 0.225 | 0.633 | 0.200 |
| C | 4.122 | 1.591 | 0.360 |
| D | 1.040 | 6.661 | 0.890 |

TABLE 3

| | Conic coefficient | Aspheric surface coefficient | | | |
|---|---|---|---|---|---|
| | k | A4 | A6 | A8 | A10 |
| S1 | 0.0000E+00 | −5.7385E−03 | 3.6299E−04 | −2.0970E−05 | 1.3349E−06 |
| S2 | 0.0000E+00 | −8.2258E−03 | 6.3034E−04 | −9.4459E−05 | 1.2558E−05 |
| S3 | −3.0952E−01 | 7.4776E−04 | 5.9198E−04 | −4.1787E−04 | 1.7321E−04 |
| S4 | 0.0000E+00 | 1.2256E−02 | −2.4500E−03 | 5.9863E−04 | −1.3437E−04 |
| S5 | 0.0000E+00 | −3.8659E−02 | 3.8995E−03 | 1.7269E−03 | −9.8686E−04 |
| S6 | −7.6118E+00 | −3.3312E−03 | −1.7005E−02 | 1.4689E−02 | −6.6600E−03 |
| S7 | −5.0000E+01 | 7.0086E−03 | 3.1047E−03 | −2.8514E−03 | 1.8458E−03 |
| S8 | 0.0000E+00 | 3.9299E−02 | −1.6687E−02 | 9.4272E−03 | −3.0949E−03 |
| S9 | 0.0000E+00 | 2.8733E−02 | −2.7964E−02 | 1.9781E−02 | −8.2089E−03 |
| S10 | 0.0000E+00 | 2.9511E−02 | −3.5157E−02 | 3.2777E−02 | −1.7888E−02 |
| S11 | −1.0888E+01 | −1.7153E−02 | 2.6433E−03 | −3.2400E−04 | 4.3365E−05 |
| S12 | −3.0710E+01 | −5.1779E−03 | −1.6955E−03 | 7.6430E−04 | −1.4174E−04 |

| | Conic coefficient | Aspheric surface coefficient | | |
|---|---|---|---|---|
| | k | A12 | A14 | A16 |
| S1 | 0.0000E+00 | −8.1503E−08 | 3.1114E−09 | −4.9180E−11 |
| S2 | 0.0000E+00 | −1.1269E−06 | 5.4030E−08 | −1.0782E−09 |
| S3 | −3.0952E−01 | −3.7552E−05 | 4.1525E−06 | −1.9096E−07 |
| S4 | 0.0000E+00 | 1.6965E−05 | −1.2495E−06 | 4.1593E−08 |
| S5 | 0.0000E+00 | 2.3274E−04 | −2.6947E−05 | 1.3007E−06 |
| S6 | −7.6118E+00 | 2.0674E−03 | −3.7602E−04 | 3.0038E−05 |
| S7 | −5.0000E+01 | −5.7675E−04 | 8.1320E−05 | −4.3265E−06 |
| S8 | 0.0000E+00 | 5.0214E−04 | −3.6684E−05 | 6.1773E−07 |
| S9 | 0.0000E+00 | 2.0668E−03 | −2.9319E−04 | 1.9034E−05 |
| S10 | 0.0000E+00 | 5.7863E−03 | −1.0236E−03 | 7.7626E−05 |
| S11 | −1.0888E+01 | −1.2835E−05 | 1.8482E−06 | −9.0136E−08 |
| S12 | −3.0710E+01 | 9.1737E−06 | 1.6138E−07 | −2.8105E−08 |

For convenience, an aspheric surface of each lens surface uses an aspheric surface shown in a formula (10) below. However, the present disclosure is not limited to the aspherical polynomials form shown in the formula (10).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (10)$$

Herein, k denotes a conic coefficient, A4, A6, A8, A10, A12, A14, and A16 denote aspheric surface coefficients. x denotes a vertical distance from points on an aspheric surface curve to an optical axis, y denotes a depth of the aspheric surface (a point on the aspheric surface and a distance of which from the optical axis is r, a vertical distance between the point and a tangent to a vertex on the optical axis of the aspherical surface).

TABLE 4

| | Wide | Tele |
|---|---|---|
| FNO | 1.96 | 2.84 |
| 2ω (°) | 46.29 | 24.00 |
| f (mm) | 7.110 | 14.536 |

| | Wide | Tele | When zoom lens is communicated in camera |
|---|---|---|---|
| TTL (mm) | 20.298 | 15.323 | 7.870 |
| LB (mm) | 1.423 | 7.044 | 1.273 |

| | |
|---|---|
| f1 (mm) | −19.776 |
| fG2 (mm) | 15.970 |
| f2 (mm) | 4.899 |
| f3 (mm) | −8.549 |
| f4 (mm) | −7.110 |
| f5 (mm) | 6.308 |
| f6 (mm) | −23.877 |
| IH (mm) | 3.074 |
| zoom ratio | 2.044 |

The following table 21 further shows values corresponding to various parameters specified in conditional formulas in each of embodiments 1, 2, 3, 4, and 5.

As shown in table 21, relationships (1)-(9) are satisfied in the first embodiment.

Figure 2:
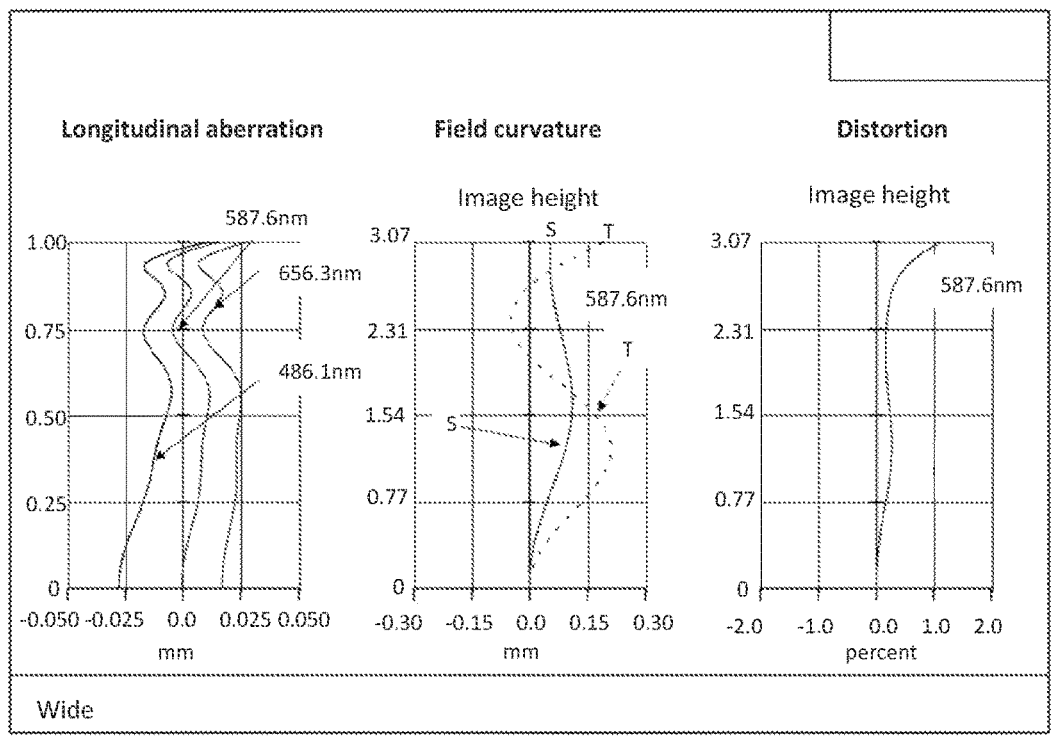
FIG. 2 is a schematic diagram of a longitudinal aberration, field curvature, and a distortion, in a wide-angle end of the zoom lens according to the first embodiment of the present disclosure.
Figure 3:
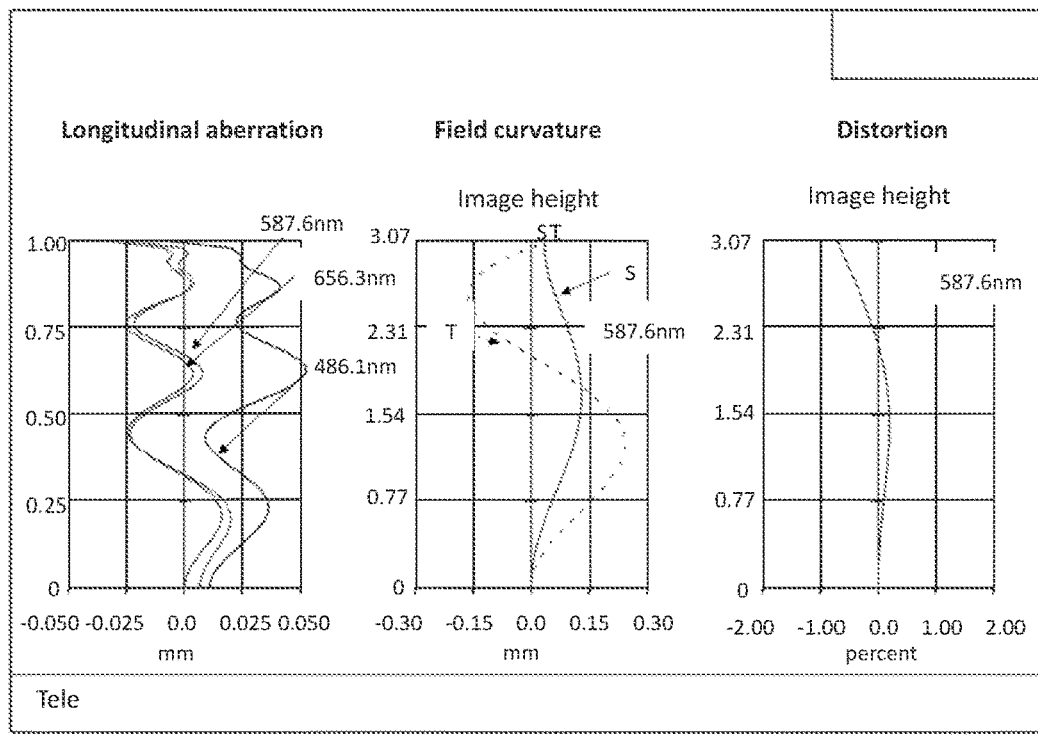
FIG. 3 is a schematic diagram of a longitudinal aberration, field curvature, and a distortion, in a telephoto end of the zoom lens according to the first embodiment of the present disclosure.
Figure 4:
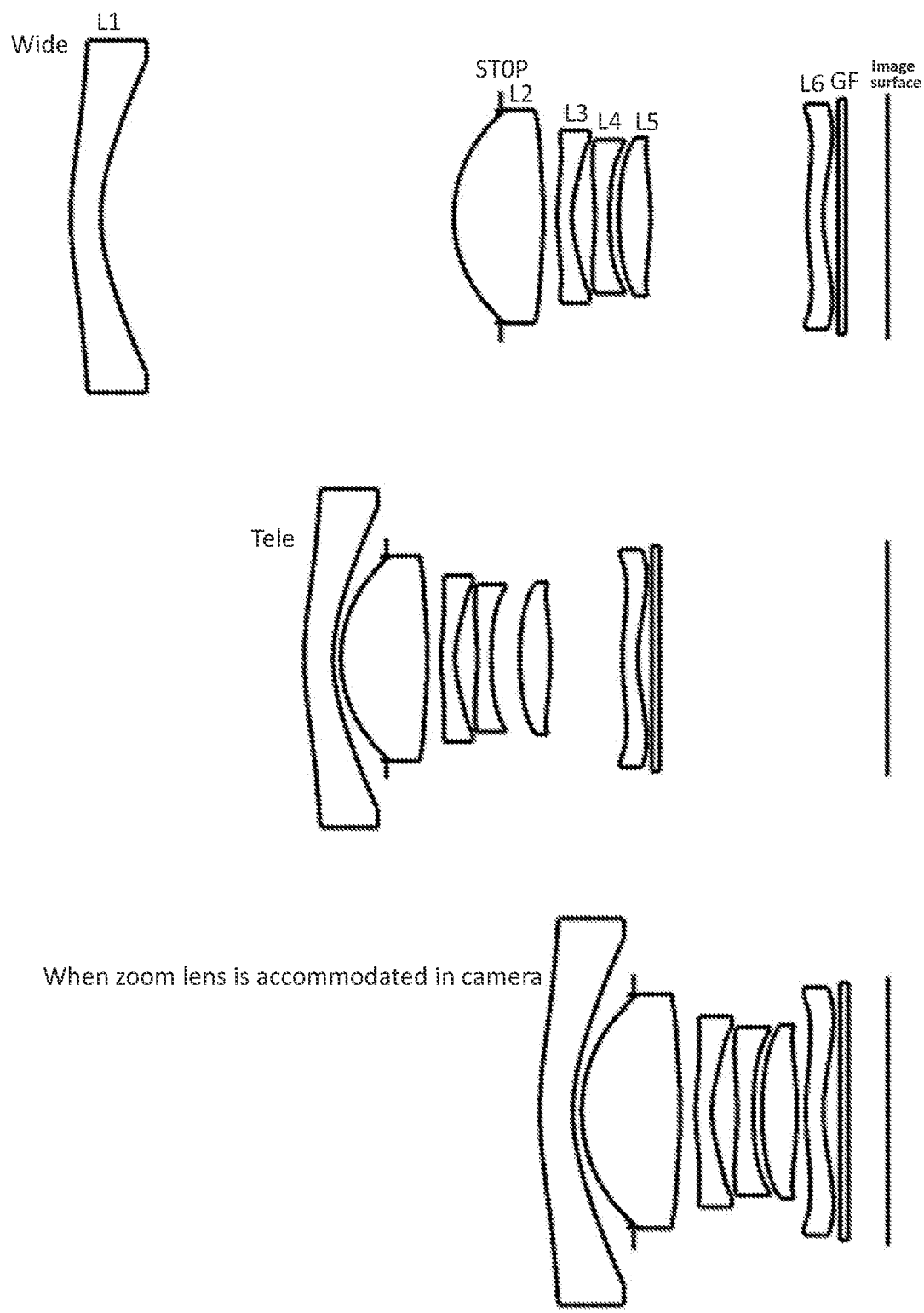
FIG. 4 is a schematic diagram of a structure of a zoom lens LA according to a second embodiment of the present disclosure.

FIG. 2 is a schematic diagram of a longitudinal aberration, field curvature, and a distortion, in a wide-angle end of the zoom lens according to the first embodiment of the present disclosure. FIG. 3 is a schematic diagram of a longitudinal aberration, field curvature, and a distortion, in a telephoto end of the zoom lens according to the first embodiment of the present disclosure. A field curvature S in FIG. 4 is a field curvature in a sagittal direction, and T is a field curvature in a tangential direction, which are also applied in embodiments 2-5. When the zoom lens LA of the first embodiment is accommodated in the camera, the TTL is equal to 7.870, the zoom lens LA becomes mini. When the FNO of the wide-angle end is equal to 1.96, the zoom lens LA becomes bright, the zoom ratio is equal to 2.044, as shown in FIGS. 2-3, the zoom lens LA further has good optical performance.

In the embodiment, an entrance pupil diameter is denoted as ENPD and the ENPD of the camera optical lens 10 is 0.879 mm. An image height is denoted as IH and the IH is 4.000 mm. A field of view is denoted as FOV and the FOV in a diagonal is 158.00 degree. The camera optical lens 10 meets the design requirements of large aperture, wide-angle, and ultra-thinness, on-axis and off-axis chromatic aberrations of which are fully corrected, and the camera optical lens 10 has excellent optical characteristics.

Embodiment 2

FIG. 4 is a schematic diagram of a structure of a zoom lens LA according to a second embodiment of the present disclosure. Table 5 shows date of curvature radius R, on-axis thickness and on-axis distance d, refractive index nd, and abbe number vd of each of the lenses. Table 6 shows a corresponding value of A to D respectively during photographing and the zoom lens is accommodated in the camera. Table 7 shows a conic coefficient k and aspheric surface coefficient. Table 8 shows the data of FNO, 2ω, f, TTL, LB, f1, fG2, f2, f3, f4, f5, f6, IH, and zoom ratio.

TABLE 5

|  |  | R | d |  | nd |  | vd | Effective radius (mm) |
|---|---|---|---|---|---|---|---|---|
| S1 | R1 | 7.85611 | d1 | 0.755 | nd1 | 1.4959 | v1 | 81.655 | 4.400 |
| S2 | R2 | 4.27586 | D12 d2 | A | | | | 3.928 |
| Stop | | ∞ | d3 | −1.181 | | | | 2.653 |
| S3 | R3 | 3.34061 | d4 | 2.249 | nd2 | 1.5438 | v2 | 56.029 | 2.665 |
| S4 | R4 | −9.29516 | d5 | 0.348 | | | | 2.505 |
| S5 | R5 | 5.01403 | d6 | 0.369 | nd3 | 1.6153 | v3 | 25.936 | 2.167 |
| S6 | R6 | 2.47207 | d7 | 0.575 | | | | 1.920 |
| S7 | R7 | −7.39526 | d8 | 0.372 | nd4 | 1.6700 | v4 | 19.392 | 1.916 |
| S8 | R8 | 13.50619 | d9 | B | | | | 1.883 |
| S9 | R9 | 7.95199 | d10 | 0.790 | nd5 | 1.6153 | v5 | 25.936 | 1.976 |
| S10 | R10 | −7.40039 | d11 | C | | | | 1.957 |
| S11 | R11 | 6.04949 | d12 | 0.400 | nd6 | 1.5346 | v6 | 55.695 | 2.633 |
| S12 | R12 | 3.88313 | d13 | 0.367 | | | | 2.825 |
| S13 | R13 | ∞ | d14 | 0.210 | ndg | 1.5168 | vg | 64.167 | 2.891 |
| S14 | R14 | ∞ | d15 | D | | | | 2.933 |

Wavelength for reference: 587.6 nm

TABLE 6

|  | When photographing | | When the zoom lens is accommodated |
|---|---|---|---|
|  | Wide | Tele | |
| A | 10.027 | 1.382 | 1.381 |
| B | 0.228 | 0.737 | 0.200 |
| C | 3.932 | 1.873 | 0.200 |
| D | 1.040 | 5.909 | 0.890 |

TABLE 7

| | Conic coefficient | Aspheric surface coefficient | | | |
|---|---|---|---|---|---|
| | k | A4 | A6 | A8 | A10 |
| S1 | 0.0000E+00 | −5.7385E−03 | 3.6299E−04 | −2.0970E−05 | 1.3349E−06 |
| S2 | 0.0000E+00 | −8.2258E−03 | 6.3034E−04 | −9.4459E−05 | 1.2558E−05 |
| S3 | −3.4604E−01 | 7.4776E−04 | 5.9198E−04 | −4.1787E−04 | 1.7321E−04 |
| S4 | 0.0000E+00 | 1.2256E−02 | −2.4500E−03 | 5.9863E−04 | −1.3437E−04 |
| S5 | 0.0000E+00 | −3.8659E−02 | 3.8995E−03 | 1.7269E−03 | −9.8686E−04 |
| S6 | −7.3622E+00 | −4.0242E−03 | −1.6553E−02 | 1.4133E−02 | −6.3262E−03 |
| S7 | −4.9931E+01 | 7.0086E−03 | 3.1047E−03 | −2.8514E−03 | 1.8458E−03 |
| S8 | 0.0000E+00 | 2.2997E−02 | 5.1423E−03 | −8.1196E−03 | 5.3772E−03 |
| S9 | 0.0000E+00 | 5.6199E−03 | 6.3134E−03 | −7.5190E−03 | 4.4893E−03 |
| S10 | 0.0000E+00 | 1.5263E−02 | −1.0533E−02 | 9.9879E−03 | −5.5760E−03 |
| S11 | −1.0309E+01 | −1.7153E−02 | 2.6433E−03 | −3.2400E−04 | 4.3365E−05 |
| S12 | −1.3533E+01 | −5.1779E−03 | −1.6955E−03 | 7.6430E−04 | −1.4174E−04 |

| | Conic coefficient | Aspheric surface coefficient | | |
|---|---|---|---|---|
| | k | A12 | A14 | A16 |
| S1 | 0.0000E+00 | −8.1503E−08 | 3.1114E−09 | −4.9180E−11 |
| S2 | 0.0000E+00 | −1.1269E−06 | 5.4030E−08 | −1.0782E−09 |
| S3 | −3.4604E−01 | −3.7552E−05 | 4.1525E−06 | −1.9096E−07 |

TABLE 7-continued

| S4 | 0.0000E+00 | 1.6965E−05 | −1.2495E−06 | 4.1593E−08 |
| S5 | 0.0000E+00 | 2.3274E−04 | −2.6947E−05 | 1.3007E−06 |
| S6 | −7.3622E+00 | 1.9197E−03 | −3.4188E−04 | 2.6649E−05 |
| S7 | −4.9931E+01 | −5.7675E−04 | 8.1320E−05 | −4.3265E−06 |
| S8 | 0.0000E+00 | −1.9020E−03 | 3.3746E−04 | −2.4089E−05 |
| S9 | 0.0000E+00 | −1.3925E−03 | 2.1756E−04 | −1.2913E−05 |
| S10 | 0.0000E+00 | 1.8776E−03 | −3.4725E−04 | 2.7684E−05 |
| S11 | −1.0309E+01 | −1.2835E−05 | 1.8482E−06 | −9.0136E−08 |
| S12 | −1.3533E+01 | 9.1737E−06 | 1.6138E−07 | −2.8105E−08 |

For convenience, an aspheric surface of each lens surface uses an aspheric surface shown in a formula (10) below. However, the present disclosure is not limited to the aspherical polynomials form shown in the formula (10).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (10)$$

Herein, k denotes a conic coefficient, A4, A6, A8, A10, A12, A14, and A16 denote aspheric surface coefficients. x denotes a vertical distance from points on an aspheric surface curve to an optical axis, y denotes a depth of the aspheric surface (a point on the aspheric surface and a distance of which from the optical axis is r, a vertical distance between the point and a tangent to a vertex on the optical axis of the aspherical surface).

TABLE 8

|  | Wide | Tele |
|---|---|---|
| FNO | 1.96 | 2.78 |
| 2ω (°) | 46.91 | 24.64 |
| f (mm) | 7.110 | 14.220 |

|  | Wide | Tele | When zoom lens is communicated in camera |
|---|---|---|---|
| TTL (mm) | 20.481 | 15.154 | 7.925 |
| LB (mm) | 1.617 | 6.486 | 1.467 |

| f1 (mm) | −20.341 |
| fG2 (mm) | 16.293 |
| f2 (mm) | 4.821 |

TABLE 8-continued

| | |
|---|---|
| f3 (mm) | −8.389 |
| f4 (mm) | −7.081 |
| f5 (mm) | 6.354 |
| f6 (mm) | −21.678 |
| IH (mm) | 3.074 |
| zoom ratio | 2.000 |

As shown in table 21, relationships (1)-(9) are satisfied in the second embodiment.

Figure 5:
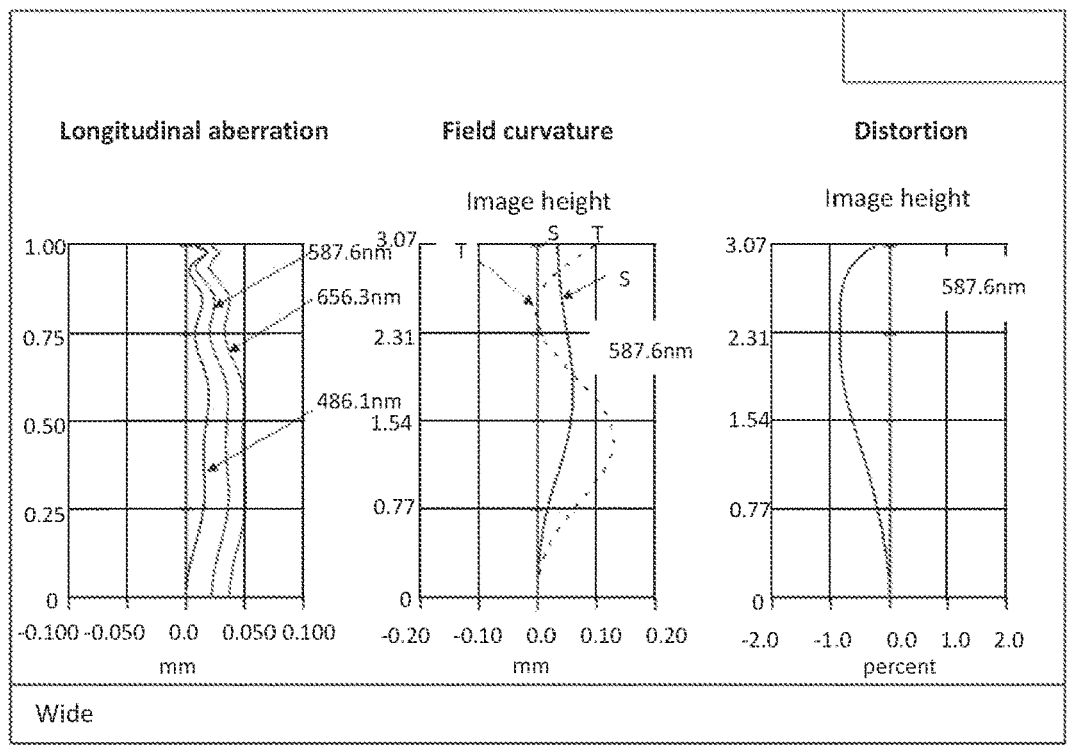
FIG. 5 is a schematic diagram of a longitudinal aberration, field curvature, and a distortion, in a wide-angle end of the zoom lens according to the second embodiment of the present disclosure.
Figure 6:
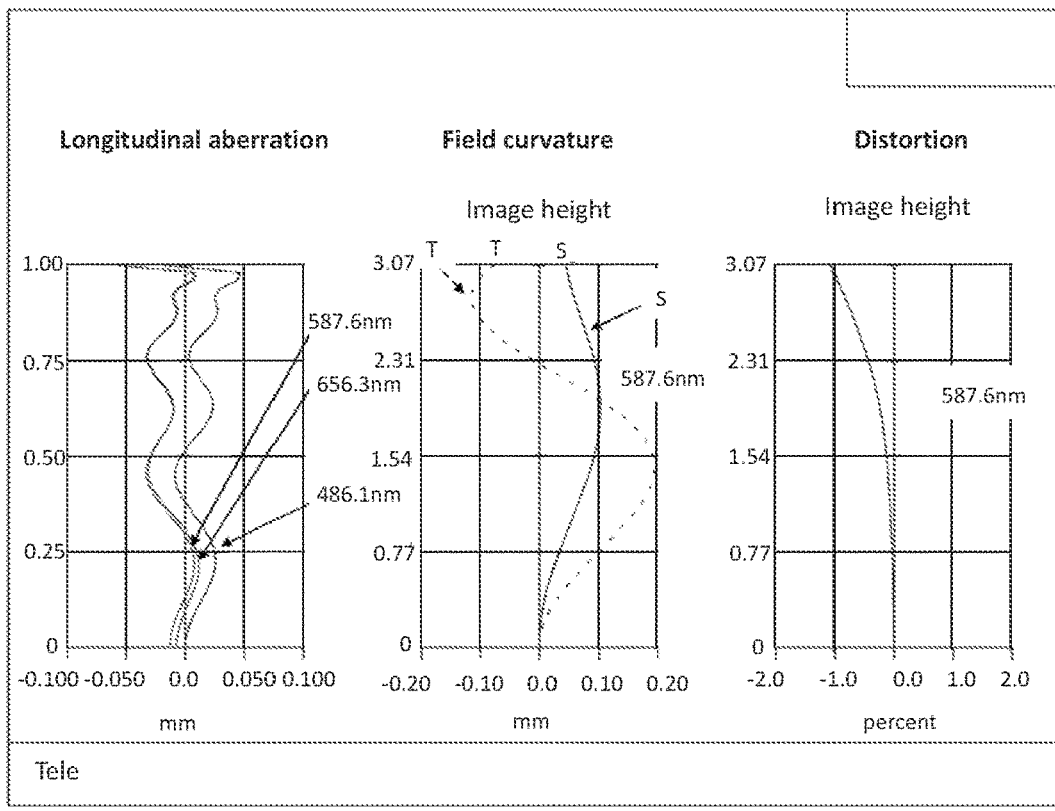
FIG. 6 is a schematic diagram of a longitudinal aberration, field curvature, and a distortion, in a telephoto end of the zoom lens according to the second embodiment of the present disclosure.

FIG. 5 is a schematic diagram of a longitudinal aberration, field curvature, and a distortion, in a wide-angle end of the zoom lens according to the second embodiment of the present disclosure. FIG. 6 is a schematic diagram of a longitudinal aberration, field curvature, and a distortion, in a telephoto end of the zoom lens according to the second embodiment of the present disclosure. When the zoom lens LA of the second embodiment is accommodated in the camera, the TTL is equal to 7.925, the zoom lens LA becomes mini. When the FNO of the wide-angle end is equal to 1.96, the zoom lens LA becomes bright, the zoom ratio is equal to 2.000, as shown in FIGS. 5-6, the zoom lens LA further has good optical performance.

Embodiment 3

Figure 7:
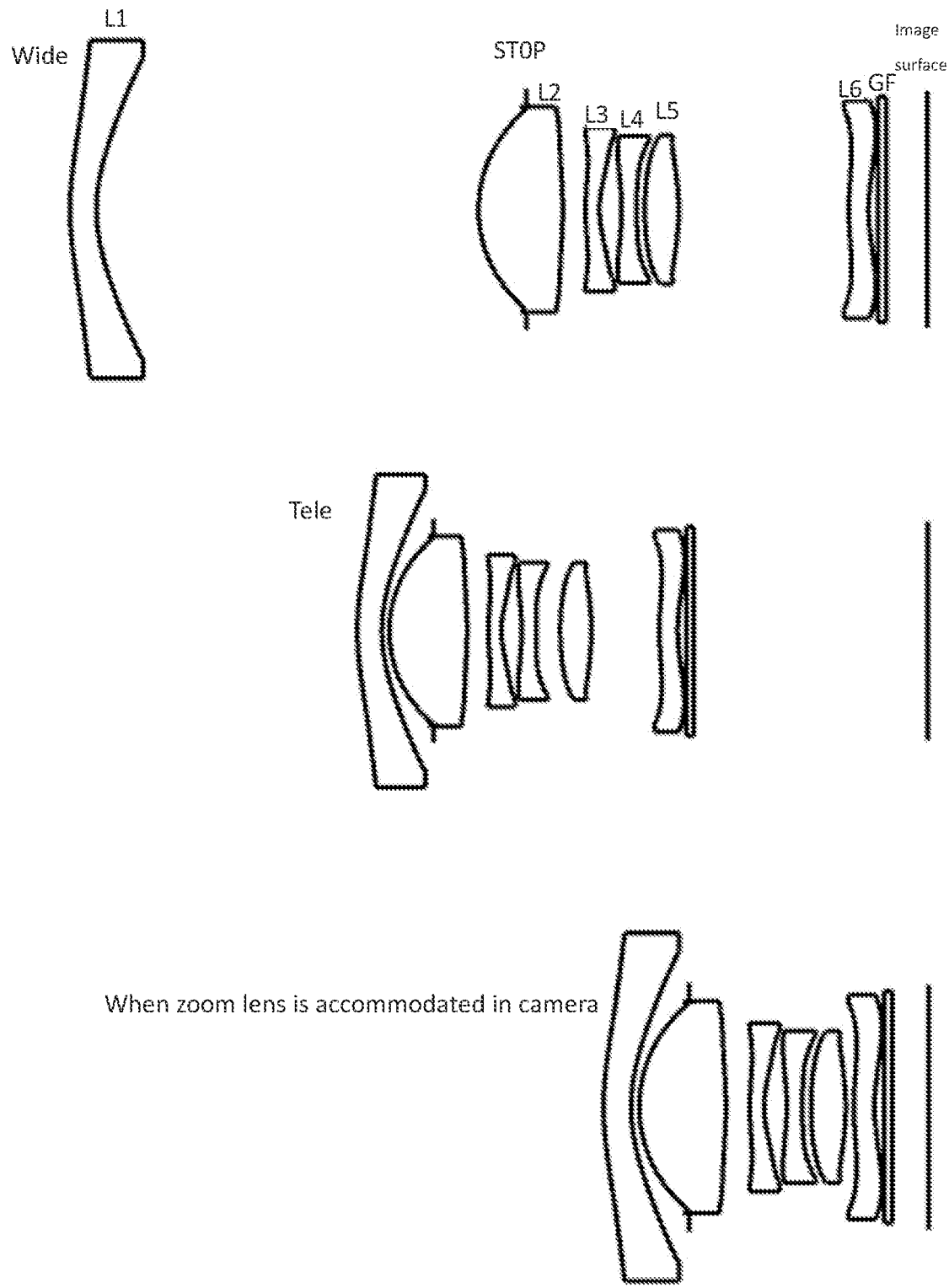
FIG. 7 is a schematic diagram of a structure of a zoom lens LA according to a third embodiment of the present disclosure.

FIG. 7 is a schematic diagram of a structure of a zoom lens LA according to a third embodiment of the present disclosure. Table 9 shows date of curvature radius R, on-axis thickness and on-axis distance d, refractive index nd, and abbe number vd of each of the lenses. Table 10 shows a corresponding value of A to D respectively during photographing and the zoom lens is accommodated in the camera. Table 11 shows a conic coefficient k and aspheric surface coefficient. Table 12 shows the data of FNO, 2ω, f, TTL, LB, f1, fG2, f2, f3, f4, f5, f6, IH, and zoom ratio.

TABLE 9

| | | R | d | | nd | vd | Effective radius (mm) |
|---|---|---|---|---|---|---|---|
| S1 | R1 | 7.46267 | d1 | 0.664 | nd1 1.4959 | v1 81.655 | 4.380 |
| S2 | R2 | 4.26720 | d2 | A | | | 3.945 |
| Stop | | ∞ | D12 d3 | −1.198 | | | 2.656 |
| S3 | R3 | 3.42597 | d4 | 2.105 | nd2 1.5438 | v2 56.029 | 2.659 |
| S4 | R4 | −10.42114 | d5 | 0.575 | | | 2.505 |
| S5 | R5 | 6.09062 | d6 | 0.350 | nd3 1.6153 | v3 25.936 | 2.123 |
| S6 | R6 | 2.43733 | d7 | 0.554 | | | 1.927 |
| S7 | R7 | −5.83850 | d8 | 0.383 | nd4 1.6700 | v4 19.392 | 1.917 |
| S8 | R8 | −1.8486E+04 | d9 | B | | | 1.862 |
| S9 | R9 | 10.01671 | d10 | 0.848 | nd5 1.6153 | v5 25.936 | 1.920 |
| S10 | R10 | −5.79361 | d11 | C | | | 1.907 |
| S11 | R11 | 7.72372 | d12 | 0.495 | nd6 1.5346 | v6 55.695 | 2.593 |
| S12 | R12 | 4.55751 | d13 | 0.228 | | | 2.825 |
| S13 | R13 | ∞ | d14 | 0.210 | ndg 1.5168 | vg 64.167 | 2.877 |
| S14 | R14 | ∞ | d15 | D | | | 2.924 |

Wavelength for reference: 587.6 nm

TABLE 10

| | When photographing | | When the zoom lens is accommodated |
|---|---|---|---|
| | Wide | Tele | |
| A | 10.778 | 1.398 | 1.398 |
| B | 0.200 | 0.655 | 0.200 |
| C | 4.269 | 1.836 | 0.200 |
| D | 1.040 | 6.323 | 0.890 |

TABLE 11

| | Conic coefficient | Aspheric surface coefficient | | | |
|---|---|---|---|---|---|
| | k | A4 | A6 | A8 | A10 |
| S1 | 0.0000E+00 | −5.7385E−03 | 3.6299E−04 | −2.0970E−05 | 1.3349E−06 |
| S2 | 0.0000E+00 | −8.2258E−03 | 6.3034E−04 | −9.4459E−05 | 1.2558E−05 |
| S3 | −2.9795E−01 | 7.4776E−04 | 5.9198E−04 | −4.1787E−04 | 1.7321E−04 |
| S4 | 0.0000E+00 | 1.2256E−02 | −2.4500E−03 | 5.9863E−04 | −1.3437E−04 |
| S5 | 0.0000E+00 | −3.8659E−02 | 3.8995E−03 | 1.7269E−03 | −9.8686E−04 |
| S6 | −1.6152E+01 | 3.3119E−02 | −5.2214E−02 | 3.1740E−02 | −1.1387E−02 |
| S7 | −2.8609E+01 | 7.0086E−03 | 3.1047E−03 | −2.8514E−03 | 1.8458E−03 |
| S8 | 0.0000E+00 | 7.5818E−02 | −6.9821E−02 | 5.9611E−02 | −3.0265E−02 |
| S9 | 0.0000E+00 | 5.3072E−02 | −6.7867E−02 | 5.2936E−02 | −2.3826E−02 |
| S10 | 0.0000E+00 | 4.7580E−02 | −7.0519E−02 | 6.4055E−02 | −3.3541E−02 |
| S11 | −1.6562E+01 | −1.7153E−02 | 2.6433E−03 | −3.2400E−04 | 4.3365E−05 |
| S12 | −1.9405E+01 | −5.1779E−03 | −1.6955E−03 | 7.6430E−04 | −1.4174E−04 |

| | Conic coefficient | Aspheric surface coefficient | | |
|---|---|---|---|---|
| | k | A12 | A14 | A16 |
| S1 | 0.0000E+00 | −8.1503E−08 | 3.1114E−09 | −4.9180E−11 |
| S2 | 0.0000E+00 | −1.1269E−06 | 5.4030E−08 | −1.0782E−09 |
| S3 | −2.9795E−01 | −3.7552E−05 | 4.1525E−06 | −1.9096E−07 |

TABLE 11-continued

| S4 | 0.0000E+00 | 1.6965E−05 | −1.2495E−06 | 4.1593E−08 |
| S5 | 0.0000E+00 | 2.3274E−04 | −2.6947E−05 | 1.3007E−06 |
| S6 | −1.6152E+01 | 2.7453E−03 | −4.0346E−04 | 2.6885E−05 |
| S7 | −2.8609E+01 | −5.7675E−04 | 8.1320E−05 | −4.3265E−06 |
| S8 | 0.0000E+00 | 8.8179E−03 | −1.3829E−03 | 9.0597E−05 |

TABLE 11-continued

| | | | | |
|---|---|---|---|---|
| S9 | 0.0000E+00 | 6.2820E−03 | −8.9843E−04 | 5.4650E−05 |
| S10 | 0.0000E+00 | 1.0269E−02 | −1.7013E−03 | 1.1907E−04 |
| S11 | −1.6562E+01 | −1.2835E−05 | 1.8482E−06 | −9.0136E−08 |
| S12 | −1.9405E+01 | 9.1737E−06 | 1.6138E−07 | −2.8105E−08 |

For convenience, an aspheric surface of each lens surface uses an aspheric surface shown in a formula (10) below. However, the present disclosure is not limited to the aspherical polynomials form shown in the formula (10).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (10)$$

Herein, k denotes a conic coefficient, A4, A6, A8, A10, A12, A14, and A16 denote aspheric surface coefficients. x denotes a vertical distance from points on an aspheric surface curve to an optical axis, y denotes a depth of the aspheric surface (a point on the aspheric surface and a distance of which from the optical axis is r, a vertical distance between the point and a tangent to a vertex on the optical axis of the aspherical surface).

TABLE 12

| | Wide | Tele |
|---|---|---|
| FNO | 1.97 | 2.77 |
| 2ω (°) | 45.18 | 24.52 |
| f (mm) | 7.110 | 14.220 |

| | Wide | Tele | When zoom lens is communicated in camera |
|---|---|---|---|
| TTL (mm) | 21.500 | 15.425 | 7.902 |
| LB (mm) | 1.478 | 6.761 | 1.328 |

| | |
|---|---|
| f1 (mm) | −21.582 |
| fG2 (mm) | 19.983 |

TABLE 12-continued

| | |
|---|---|
| f2 (mm) | 5.009 |
| f3 (mm) | −6.854 |
| f4 (mm) | −8.716 |
| f5 (mm) | 6.090 |
| f6 (mm) | −21.995 |
| IH (mm) | 3.074 |
| zoom ratio | 2.000 |

As shown in table 21, relationships (1)-(9) are satisfied in the third embodiment.

Figure 8:
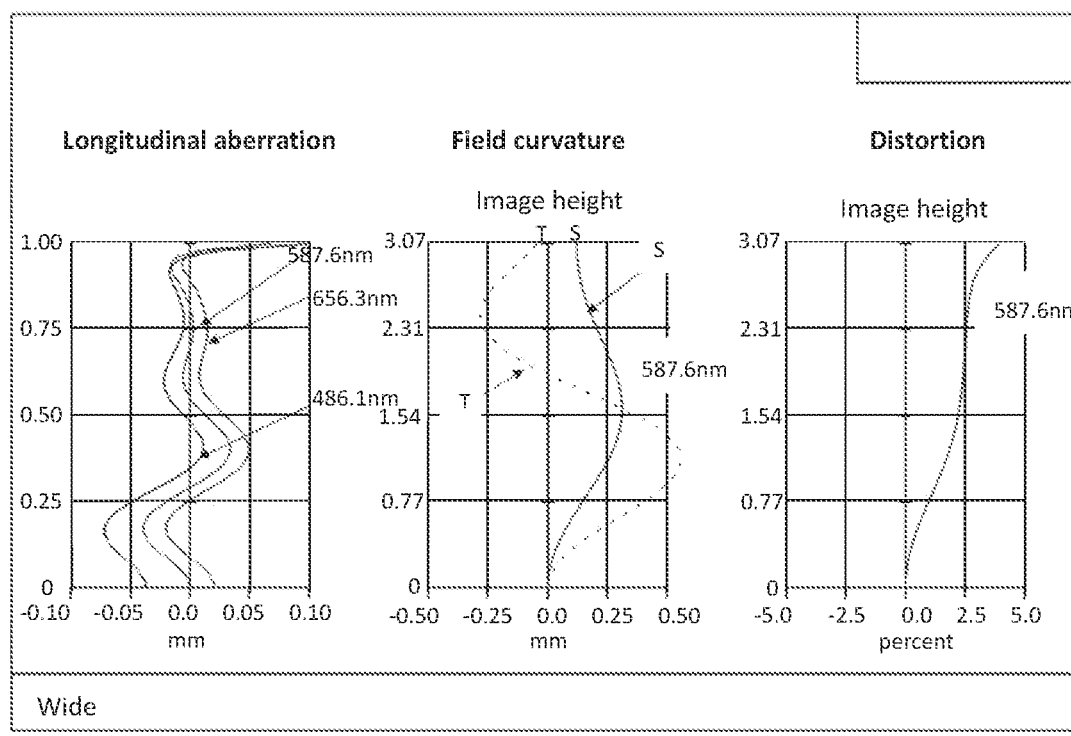
FIG. 8 is a schematic diagram of a longitudinal aberration, field curvature, and a distortion, in a wide-angle end of the zoom lens according to the third embodiment of the present disclosure.
Figure 9:
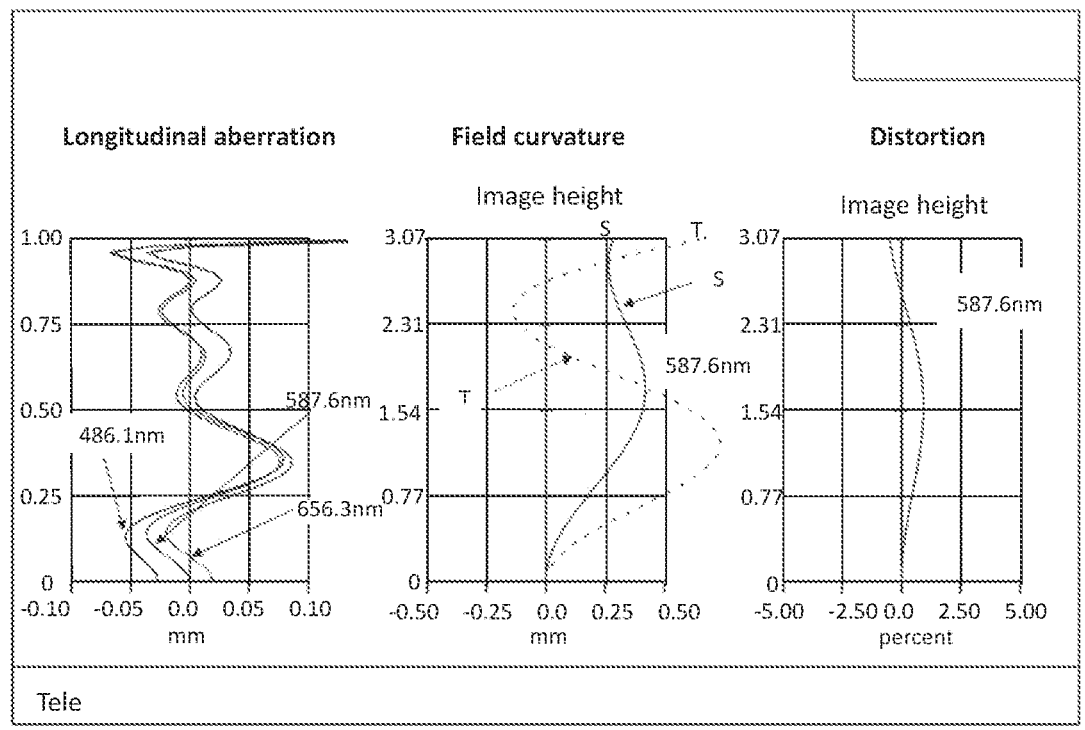
FIG. 9 is a schematic diagram of a longitudinal aberration, field curvature, and a distortion, in a telephoto end of the zoom lens according to the third embodiment of the present disclosure.

FIG. 8 is a schematic diagram of a longitudinal aberration, field curvature, and a distortion, in a wide-angle end of the zoom lens according to the third embodiment of the present disclosure. FIG. 9 is a schematic diagram of a longitudinal aberration, field curvature, and a distortion, in a telephoto end of the zoom lens according to the third embodiment of the present disclosure. When the zoom lens LA of the second embodiment is accommodated in the camera, the TTL is equal to 7.902, the zoom lens LA becomes mini. When the FNO of the wide-angle end is equal to 1.97, the zoom lens LA becomes bright, the zoom ratio is equal to 2.000, as shown in FIGS. 8-9, the zoom lens LA further has good optical performance.

Embodiment 4

Figure 10:
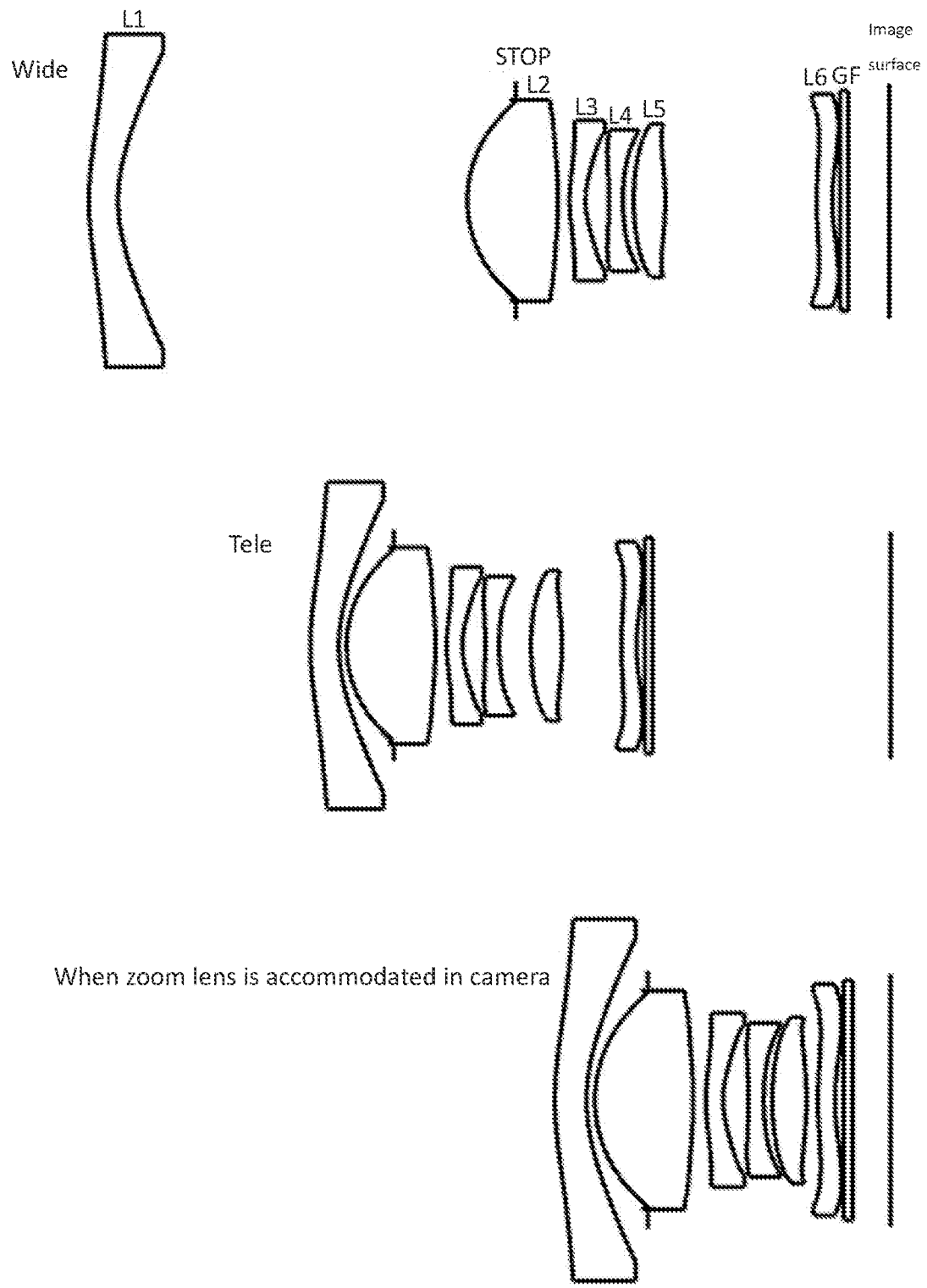
FIG. 10 is a schematic diagram of a structure of a zoom lens LA according to a fourth embodiment of the present disclosure.

FIG. 10 is a schematic diagram of a structure of a zoom lens LA according to a fourth embodiment of the present disclosure. Table 13 shows date of curvature radius R, on-axis thickness and on-axis distance d, refractive index nd, and abbe number vd of each of the lenses. Table 14 shows a corresponding value of A to D respectively during photographing and the zoom lens is accommodated in the camera. Table 15 shows a conic coefficient k and aspheric surface coefficient. Table 16 shows the data of FNO, 2ω, f, TTL, LB, f1, fG2, f2, f3, f4, f5, f6, IH, and zoom ratio.

TABLE 13

| | | R | d | | nd | | vd | Effective radius (mm) |
|---|---|---|---|---|---|---|---|---|
| S1 | R1 | 7.81273 | d1 | 0.742 | nd1 | 1.4959 | v1 | 81.655 | 4.404 |
| S2 | R2 | 4.27534 | D12 d2 | A | | | | | 3.939 |
| Stop | | ∞ | d3 | −1.236 | | | | | 2.657 |
| S3 | R3 | 3.27848 | d4 | 2.318 | nd2 | 1.5438 | v2 | 56.029 | 2.663 |
| S4 | R4 | −8.84845 | d5 | 0.292 | | | | | 2.490 |
| S5 | R5 | 4.48611 | d6 | 0.405 | nd3 | 1.6153 | v3 | 25.936 | 2.129 |
| S6 | R6 | 2.29388 | d7 | 0.596 | | | | | 1.847 |
| S7 | R7 | −12.45891 | d8 | 0.361 | nd4 | 1.6700 | v4 | 19.392 | 1.836 |
| S8 | R8 | 6.64514 | d9 | B | | | | | 1.878 |
| S9 | R9 | 6.79743 | d10 | 0.803 | nd5 | 1.6153 | v5 | 25.936 | 2.029 |
| S10 | R10 | −8.18206 | d11 | C | | | | | 1.995 |
| S11 | R11 | 8.46501 | d12 | 0.400 | nd6 | 1.5346 | v6 | 55.695 | 2.633 |
| S12 | R12 | 4.97780 | d13 | 0.210 | | | | | 2.818 |
| S13 | R13 | ∞ | d14 | 0.210 | ndg | 1.5168 | vg | 64.167 | 2.873 |
| S14 | R14 | ∞ | d15 | D | | | | | 2.918 |

Wavelength for reference: 587.6 nm

TABLE 14

|   | When photographing | | When the zoom lens is accommodated |
|---|---|---|---|
|   | Wide | Tele | |
| A | 10.147 | 1.436 | 1.436 |
| B | 0.273 | 0.828 | 0.200 |
| C | 3.860 | 1.547 | 0.270 |
| D | 1.040 | 6.193 | 0.890 |

TABLE 15

| | Conic coefficient | Aspheric surface coefficient | | | |
|---|---|---|---|---|---|
| | k | A4 | A6 | A8 | A10 |
| S1 | 0.0000E+00 | −5.7385E−03 | 3.6299E−04 | −2.0970E−05 | 1.3349E−06 |
| S2 | 0.0000E+00 | −8.2258E−03 | 6.3034E−04 | −9.4459E−05 | 1.2558E−05 |
| S3 | −3.7362E−01 | 7.4776E−04 | 5.9198E−04 | −4.1787E−04 | 1.7321E−04 |
| S4 | 0.0000E+00 | 1.2256E−02 | −2.4500E−03 | 5.9863E−04 | −1.3437E−04 |
| S5 | 0.0000E+00 | −3.8659E−02 | 3.8995E−03 | 1.7269E−03 | −9.8686E−04 |
| S6 | −5.6048E+00 | −5.8591E−03 | −1.4051E−02 | 1.3274E−02 | −6.2680E−03 |
| S7 | −5.0000E+01 | 7.0086E−03 | 3.1047E−03 | −2.8514E−03 | 1.8458E−03 |
| S8 | 0.0000E+00 | −3.2339E−03 | 2.8613E−02 | −2.4274E−02 | 1.2332E−02 |
| S9 | 0.0000E+00 | −6.4725E−03 | 1.7074E−02 | −1.3119E−02 | 5.7531E−03 |
| S10 | 0.0000E+00 | 1.3225E−02 | −1.0171E−02 | 1.1465E−02 | −7.1844E−03 |
| S11 | −6.3466E+00 | −1.7153E−02 | 2.6433E−03 | −3.2400E−04 | 4.3365E−05 |
| S12 | −2.1190E+01 | −5.1779E−03 | −1.6955E−03 | 7.6430E−04 | −1.4174E−04 |

| | Conic coefficient | Aspheric surface coefficient | | |
|---|---|---|---|---|
| | k | A12 | A14 | A16 |
| S1 | 0.0000E+00 | −8.1503E−08 | 3.1114E−09 | −4.9180E−11 |
| S2 | 0.0000E+00 | −1.1269E−06 | 5.4030E−08 | −1.0782E−09 |
| S3 | −3.7362E−01 | −3.7552E−05 | 4.1525E−06 | −1.9096E−07 |
| S4 | 0.0000E+00 | 1.6965E−05 | −1.2495E−06 | 4.1593E−08 |
| S5 | 0.0000E+00 | 2.3274E−04 | −2.6947E−05 | 1.3007E−06 |
| S6 | −5.6048E+00 | 2.0450E−03 | −3.9314E−04 | 3.3783E−05 |
| S7 | −5.0000E+01 | −5.7675E−04 | 8.1320E−05 | −4.3265E−06 |
| S8 | 0.0000E+00 | −3.6625E−03 | 5.7130E−04 | −3.6576E−05 |
| S9 | 0.0000E+00 | −1.4046E−03 | 1.7690E−04 | −8.2968E−06 |
| S10 | 0.0000E+00 | 2.5340E−03 | −4.6865E−04 | 3.6007E−05 |
| S11 | −6.3466E+00 | −1.2835E−05 | 1.8482E−06 | −9.0136E−08 |
| S12 | −2.1190E+01 | 9.1737E−06 | 1.6138E−07 | −2.8105E−08 |

For convenience, an aspheric surface of each lens surface uses an aspheric surface shown in a formula (10) below. However, the present disclosure is not limited to the aspherical polynomials form shown in the formula (10).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (10)$$

Herein, k denotes a conic coefficient, A4, A6, A8, A10, A12, A14, and A16 denote aspheric surface coefficients. x denotes a vertical distance from points on an aspheric surface curve to an optical axis, y denotes a depth of the aspheric surface (a point on the aspheric surface and a distance of which from the optical axis is r, a vertical distance between the point and a tangent to a vertex on the optical axis of the aspherical surface).

TABLE 16

| | Wide | Tele |
|---|---|---|
| FNO | 1.96 | 2.78 |
| 2ω (°) | 46.67 | 24.54 |
| f (mm) | 7.110 | 14.220 |

| | Wide | Tele | When zoom lens is communicated in camera |
|---|---|---|---|
| TTL (mm) | 20.422 | 15.105 | 7.898 |
| LB (mm) | 1.460 | 6.613 | 1.310 |
| f1 (mm) | | | −20.462 |
| fG2 (mm) | | | 15.801 |
| f2 (mm) | | | 4.716 |
| f3 (mm) | | | −8.207 |
| f4 (mm) | | | −6.419 |
| f5 (mm) | | | 6.160 |
| f6 (mm) | | | −23.544 |
| IH (mm) | | | 3.074 |
| zoom ratio | | | 2.000 |

As shown in table 21, relationships (1)-(9) are satisfied in the fourth embodiment.

Figure 11:
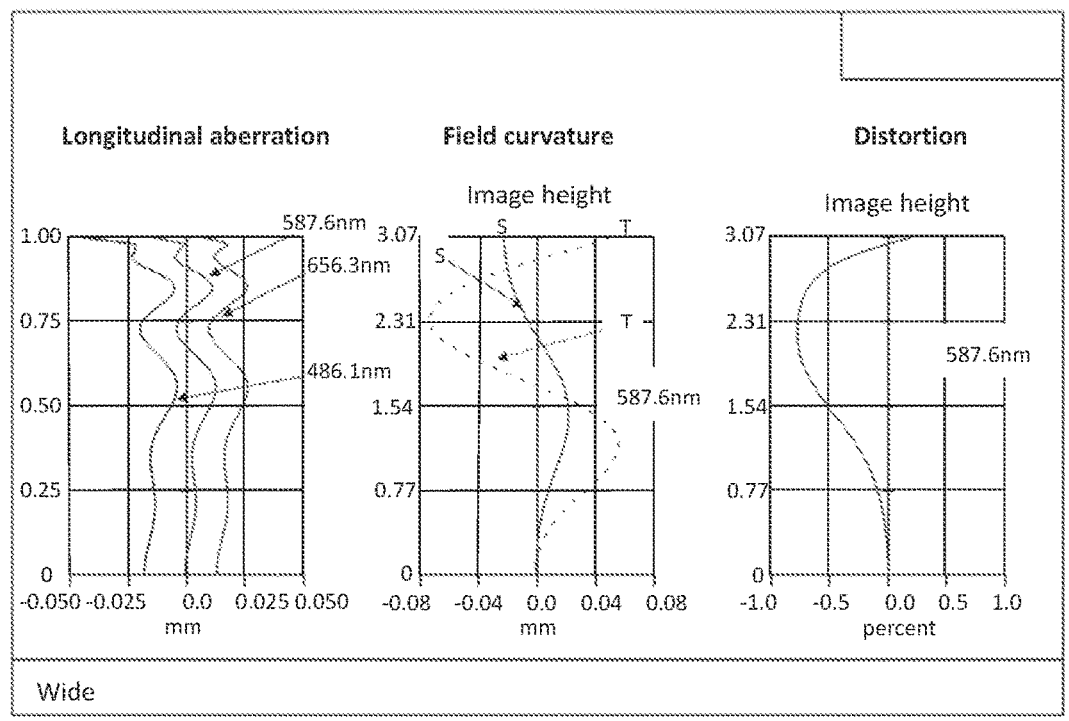
FIG. 11 is a schematic diagram of a longitudinal aberration, field curvature, and a distortion, in a wide-angle end of the zoom lens according to the fourth embodiment of the present disclosure.
Figure 12:
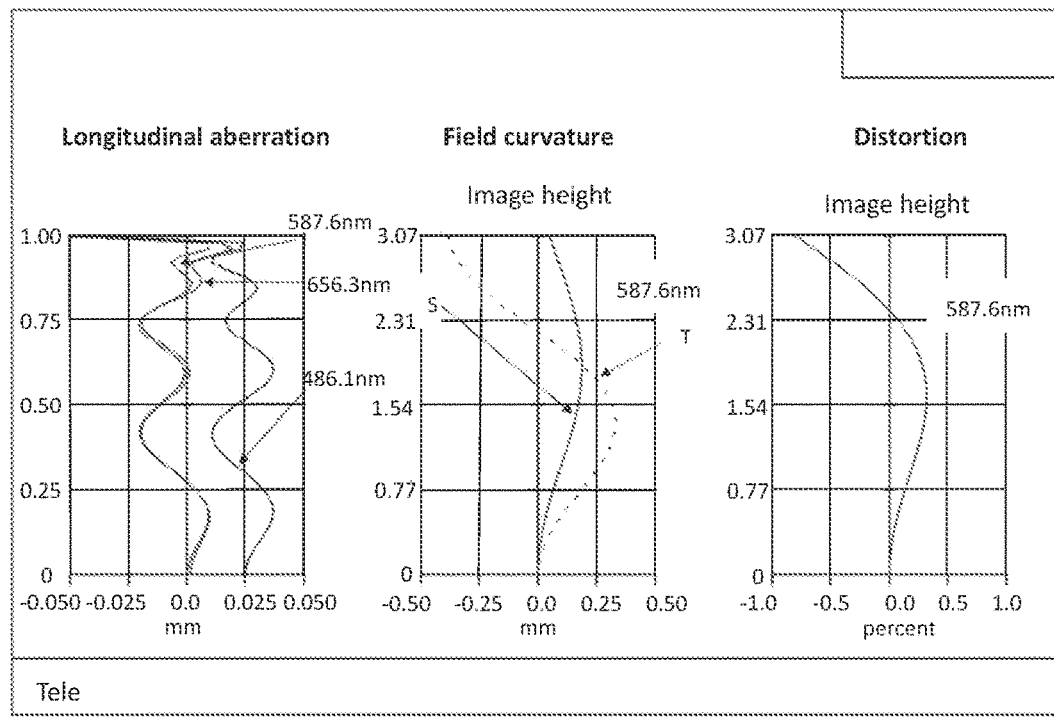
FIG. 12 is a schematic diagram of a longitudinal aberration, field curvature, and a distortion, in a telephoto end of the zoom lens according to the fourth embodiment of the present disclosure.

FIG. 11 is a schematic diagram of a longitudinal aberration, field curvature, and a distortion, in a wide-angle end of the zoom lens according to the fourth embodiment of the present disclosure. FIG. 12 is a schematic diagram of a longitudinal aberration, field curvature, and a distortion, in a telephoto end of the zoom lens according to the fourth embodiment of the present disclosure. When the zoom lens LA of the second embodiment is accommodated in the camera, the TTL is equal to 7.898, the zoom lens LA becomes mini. When the FNO of the wide-angle end is equal to 1.96, the zoom lens LA becomes bright, the zoom ratio is equal to 2.000, as shown in FIGS. 11-12, the zoom lens LA further has good optical performance.

Embodiment 5

Figure 13:
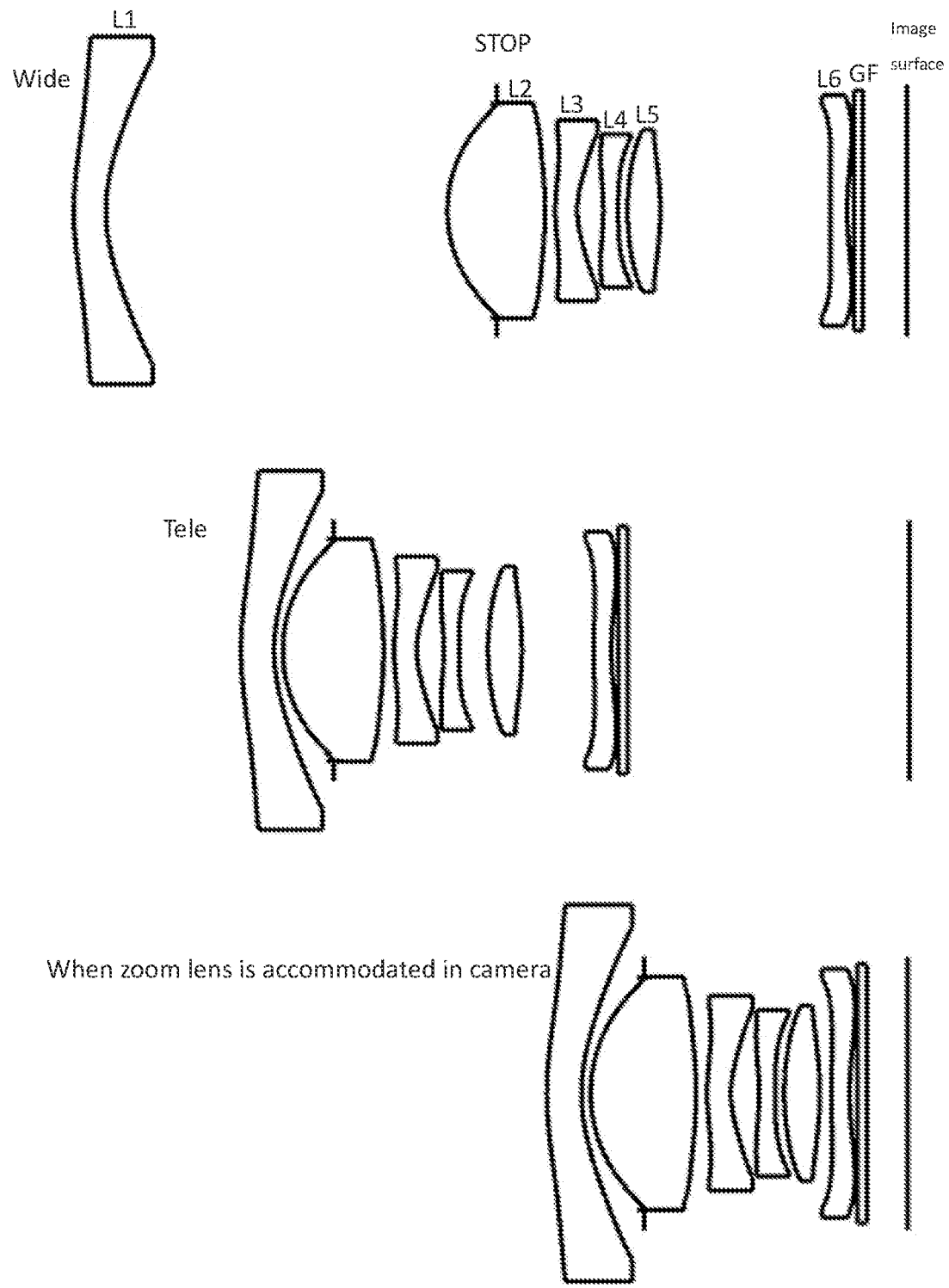
FIG. 13 is a schematic diagram of a structure of a zoom lens LA according to a fifth embodiment of the present disclosure.

FIG. 13 is a schematic diagram of a structure of a zoom lens LA according to a fifth embodiment of the present disclosure. Table 17 shows date of curvature radius R, on-axis thickness and on-axis distance d, refractive index nd, and abbe number vd of each of the lenses. Table 18 shows a corresponding value of A to D respectively during photographing and the zoom lens is accommodated in the camera. Table 19 shows a conic coefficient k and aspheric surface coefficient. Table 20 shows the data of FNO, 2ω, f, TTL, LB, f1, fG2, f2, f3, f4, f5, f6, IH, and zoom ratio.

TABLE 17

|  |  | R | d |  | nd |  | vd | Effective radius (mm) |
|---|---|---|---|---|---|---|---|---|
| S1 | R1 | 7.70579 | d1 | 0.756 | nd1 | 1.4959 | v1 | 81.655 | 4.247 |
| S2 | R2 | 4.14214 | D12 d2 | A |  |  |  | 3.755 |
| Stop |  | ∞ | d3 | −1.162 |  |  |  | 2.622 |
| S3 | R3 | 3.34187 | d4 | 2.301 | nd2 | 1.5438 | v2 | 56.029 | 2.631 |
| S4 | R4 | −8.40418 | d5 | 0.239 |  |  |  | 2.493 |
| S5 | R5 | 4.77669 | d6 | 0.517 | nd3 | 1.6153 | v3 | 25.936 | 2.206 |
| S6 | R6 | 2.22266 | d7 | 0.617 |  |  |  | 1.885 |
| S7 | R7 | −5.49224 | d8 | 0.350 | nd4 | 1.6700 | v4 | 19.392 | 1.862 |
| S8 | R8 | 35.94148 | d9 | B |  |  |  | 1.876 |
| S9 | R9 | 6.54571 | d10 | 0.774 | nd5 | 1.6153 | v5 | 25.936 | 1.957 |
| S10 | R10 | −7.56969 | d11 | C |  |  |  | 1.982 |
| S11 | R11 | 19.40691 | d12 | 0.400 | nd6 | 1.5346 | v6 | 55.695 | 2.600 |
| S12 | R12 | 7.02181 | d13 | 0.161 |  |  |  | 2.809 |
| S13 | R13 | ∞ | d14 | 0.210 | ndg | 1.5168 | vg | 64.167 | 2.882 |
| S14 | R14 | ∞ | d15 | D |  |  |  | 2.928 |

Wavelength for reference: 587.6 nm

TABLE 18

|  | When photographing | | When the zoom lens is accommodated |
|---|---|---|---|
|  | Wide | Tele | |
| A | 9.208 | 1.362 | 1.362 |
| B | 0.218 | 0.659 | 0.200 |
| C | 4.000 | 1.641 | 0.250 |
| D | 1.040 | 6.424 | 0.890 |

TABLE 19

| | Conic coefficient | Aspheric surface coefficient | | | |
|---|---|---|---|---|---|
| | k | A4 | A6 | A8 | A10 |
| S1 | 0.0000E+00 | −6.3542E−03 | 4.0075E−04 | −2.2871E−05 | 1.4974E−06 |
| S2 | 0.0000E+00 | −8.9455E−03 | 6.2478E−04 | −8.8072E−05 | 1.1746E−05 |
| S3 | −3.3426E−01 | 1.1348E−03 | 6.3258E−04 | −4.4703E−04 | 1.7448E−04 |
| S4 | 0.0000E+00 | 1.1410E−02 | −2.4589E−03 | 5.8475E−04 | −1.3561E−04 |
| S5 | 0.0000E+00 | −4.3633E−02 | 4.5756E−03 | 1.6932E−03 | −9.9040E−04 |
| S6 | −3.7020E+00 | −3.0930E−02 | 1.4048E−03 | 5.4655E−03 | −2.6803E−03 |
| S7 | −5.0000E+01 | 1.2295E−02 | 3.0404E−03 | −2.8075E−03 | 1.7203E−03 |
| S8 | 0.0000E+00 | 4.2716E−02 | −1.1983E−02 | 4.6692E−03 | −1.2865E−03 |
| S9 | 0.0000E+00 | −2.3237E−03 | 5.0431E−03 | −3.8428E−03 | 1.9235E−03 |
| S10 | 0.0000E+00 | 4.4127E−03 | 1.9464E−03 | −1.2628E−03 | 5.6504E−04 |
| S11 | 4.6432E+01 | −1.2665E−02 | 2.1486E−03 | −5.2449E−04 | 1.0829E−04 |
| S12 | −3.1439E+01 | −5.6632E−03 | −3.7959E−04 | 2.6270E−04 | −6.1321E−05 |

| | Conic coefficient | Aspheric surface coefficient | | |
|---|---|---|---|---|
| | k | A12 | A14 | A16 |
| S1 | 0.0000E+00 | −8.5424E−08 | 2.9280E−09 | −4.2182E−11 |
| S2 | 0.0000E+00 | −1.0825E−06 | 5.3958E−08 | −1.1519E−09 |
| S3 | −3.3426E−01 | −3.7121E−05 | 4.1253E−06 | −1.9615E−07 |
| S4 | 0.0000E+00 | 1.7300E−05 | −1.1907E−06 | 3.4435E−08 |
| S5 | 0.0000E+00 | 2.3183E−04 | −2.6671E−05 | 1.2887E−06 |
| S6 | −3.7020E+00 | 8.3121E−04 | −1.6594E−04 | 1.4556E−05 |
| S7 | −5.0000E+01 | −5.7979E−04 | 8.1237E−05 | −4.3620E−06 |
| S8 | 0.0000E+00 | 1.4095E−04 | −3.8184E−06 | 1.7913E−07 |
| S9 | 0.0000E+00 | −5.5964E−04 | 8.6588E−05 | −5.2664E−06 |
| S10 | 0.0000E+00 | −1.4733E−04 | 1.8623E−05 | −5.2950E−07 |
| S11 | 4.6432E+01 | −1.9436E−05 | 1.9010E−06 | −7.8844E−08 |
| S12 | −3.1439E+01 | 6.4413E−06 | −3.7189E−07 | 1.0931E−08 |

For convenience, an aspheric surface of each lens surface uses an aspheric surface shown in a formula (10) below. However, the present disclosure is not limited to the aspherical polynomials form shown in the formula (10).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (10)$$

Herein, k denotes a conic coefficient, A4, A6, A8, A10, A12, A14, and A16 denote aspheric surface coefficients. x denotes a vertical distance from points on an aspheric surface curve to an optical axis, y denotes a depth of the aspheric surface (a point on the aspheric surface and a distance of which from the optical axis is r, a vertical distance between the point and a tangent to a vertex on the optical axis of the aspherical surface).

TABLE 16

|  | Wide | Tele |
|---|---|---|
| FNO | 1.95 | 2.81 |
| 2ω (°) | 47.29 | 24.66 |
| f (mm) | 7.110 | 14.220 |

|  | Wide | Tele | When zoom lens is communicated in camera |
|---|---|---|---|
| TTL (mm) | 19.627 | 15.249 | 7.864 |
| LB (mm) | 1.411 | 6.795 | 1.261 |
| f1 (mm) | | | −19.426 |
| fG2 (mm) | | | 16.652 |
| f2 (mm) | | | 4.723 |

TABLE 16-continued

| | |
|---|---|
| f3 (mm) | −7.321 |
| f4 (mm) | −7.086 |
| f5 (mm) | 5.827 |
| f6 (mm) | −20.816 |
| IH (mm) | 3.074 |
| zoom ratio | 2.000 |

As shown in table 21, relationships (1)-(9) are satisfied in the fifth embodiment.

Figure 14:
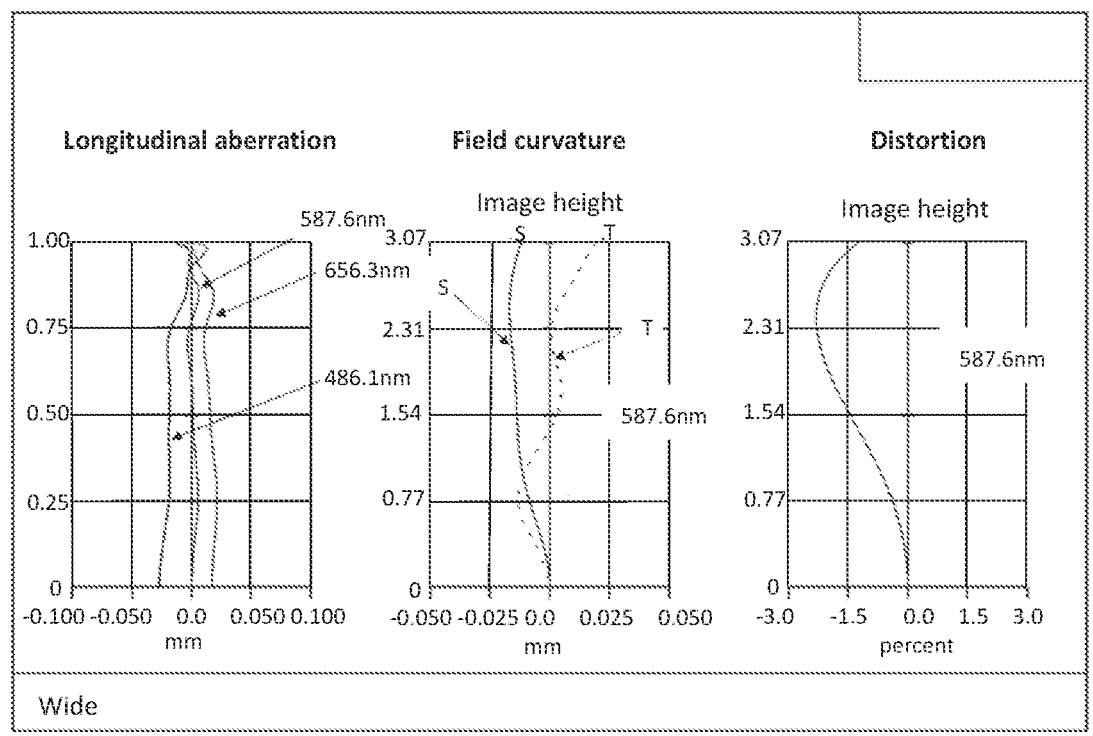
FIG. 14 is a schematic diagram of a longitudinal aberration, field curvature, and a distortion, in a wide-angle end of the zoom lens according to the fifth embodiment of the present disclosure.
Figure 15:
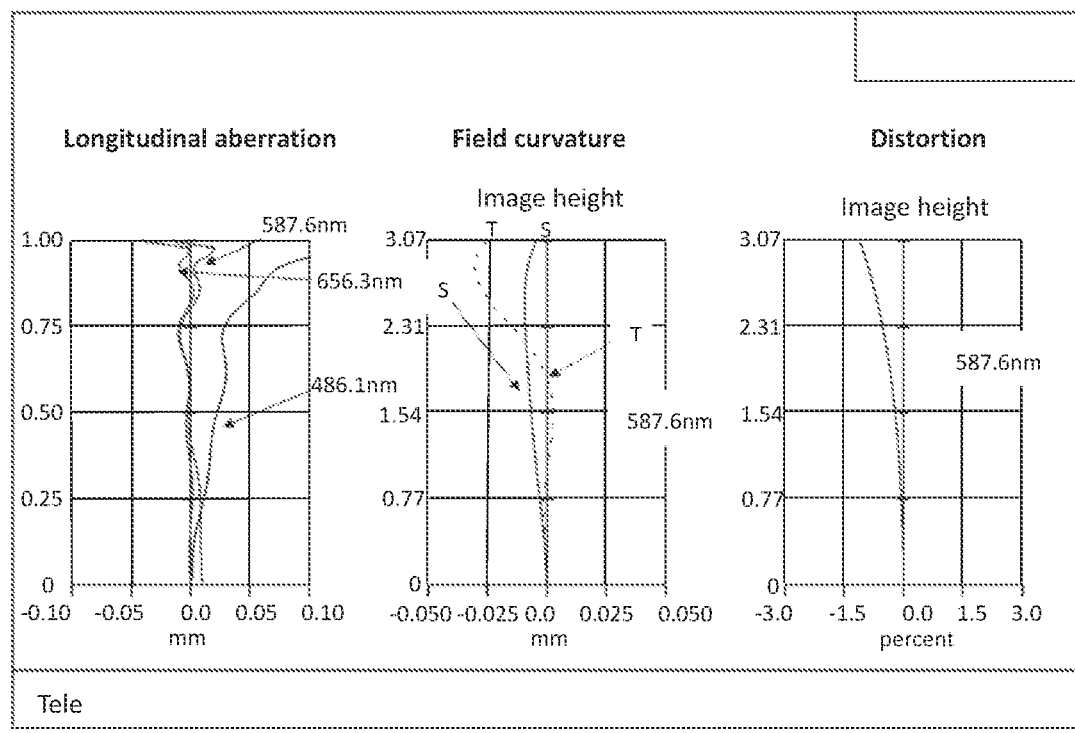
FIG. 15 is a schematic diagram of a longitudinal aberration, field curvature, and a distortion, in a telephoto end of the zoom lens according to the fifth embodiment of the present disclosure.

FIG. 14 is a schematic diagram of a longitudinal aberration, field curvature, and a distortion, in a wide-angle end of the zoom lens according to the fifth embodiment of the present disclosure. FIG. 15 is a schematic diagram of a longitudinal aberration, field curvature, and a distortion, in a telephoto end of the zoom lens according to the third embodiment of the present disclosure. When the zoom lens LA of the second embodiment is accommodated in the camera, the TTL is equal to 7.864, the zoom lens LA becomes mini. When the FNO of the wide-angle end is equal to 1.95, the zoom lens LA becomes bright, the zoom ratio is equal to 2.000, as shown in FIGS. 14-15, the zoom lens LA further has good optical performance.

The following table 21 further shows values corresponding to various parameters specified in relationships (1)-(9) in each of embodiments 1, 2, 3, 4, and 5.

TABLE 21

| Parameters and conditions | Embodiment 1 | Embodiment 2 | Embodiment 3 | Embodiment 4 | Embodiment 5 | Remarks |
|---|---|---|---|---|---|---|
| f_Tele/f_Wide | 2.044 | 2.000 | 2.000 | 2.000 | 2.000 | Relationship (1) |
| D12_Wide/D12_Tele | 40.100 | 44.000 | 47.900 | 44.555 | 40.228 | Relationship (2) |
| d11_Wide/d11_Tele | 2.590 | 2.100 | 2.325 | 2.495 | 2.437 | Relationship (3) |
| d9_Wide/d9_Tele | 0.355 | 0.310 | 0.305 | 0.330 | 0.330 | Relationship (4) |
| f1/fG2 | −1.238 | −1.248 | −1.080 | −1.295 | −1.167 | Relationship (5) |
| f3/f2 | −1.745 | −1.740 | −1.368 | −1.740 | −1.550 | Relationship (6) |
| f4/f2 | −1.451 | −1.469 | −1.740 | −1.361 | −1.500 | Relationship (7) |
| f5/fG2 | 0.395 | 0.390 | 0.305 | 0.390 | 0.350 | Relationship (8) |
| f6/fG2 | −1.495 | −1.330 | −1.101 | −1.490 | −1.250 | Relationship (9) |

It can be understood by one having ordinary skill in the art that the above-mentioned embodiments are specific embodiments of the present disclosure. In practical applications, various modifications can be made to these embodiments in forms and details without departing from the spirit and scope of the present disclosure.

What is claimed is:

1. A zoom lens, being sequentially from an object side to an image side, consisting of:
   a first lens having a negative refractive power;
   a second lens group having a positive refractive power;
   a fifth lens having a positive refractive power; and
   a sixth lens having a negative refractive power;
   wherein, when zooming, among the first lens, the second lens group, the fifth lens, and the sixth lens, a spacing in an optical axis direction of adjacent lenses or lens groups changes;
   wherein, the second lens group consists of a second lens having a positive refractive power, a third lens having a negative refractive power, and a fourth lens having a negative positive power;
   wherein, a focal length of the zoom lens in a wide-angle end is denoted as f_Wide, a focal length of the zoom lens in a telephoto end is denoted as f_Tele, an on-axis distance from an image side surface of the first lens to an object side surface of the second lens, in the wide-angle end, is denoted as D12_Wide, an on-axis distance from the image side surface of the first lens to the object side surface of the second lens, in the telephoto end, is denoted as D12_Tele, an on-axis distance from an image side surface of the fifth lens to an object side surface of the sixth lens, in the wide-angle end, is denoted as d11_Wide, an on-axis distance from the image side surface of the fifth lens to the object side surface of the sixth lens, in the telephoto end, is denoted as d11_Tele, total number of lenses in the zoom lens with refractive power is six, and the zoom lens satisfies following relationships (1)~(3):

$$f\_Tele/f\_Wide \geq 1.80 \quad (1);$$

$$40.00 \leq D12\_Wide/D12\_Tele \leq 48.00 \quad (2);$$

$$2.00 \leq d11\_Wide/d11\_Tele \leq 2.60 \quad (3).$$

2. The zoom lens according to claim 1, wherein an on-axis distance from an image side surface of the fourth lens to an object side surface of the fifth lens, in the wide-angle end, is denoted as d9_Wide, an on-axis distance from the image side surface of the fourth lens to the object side surface of the fifth lens, in the telephoto end, is denoted as d9_Tele, and the zoom lens satisfies a following relationship (4):

$$0.30 \leq d9\_Wide/d9\_Tele \leq 0.36 \quad (4).$$

3. The zoom lens according to claim 1, wherein a focal length of the first lens is denoted f1, a combined focal lens of the second lens group is denoted as fG2, and the zoom lens satisfies a following relationship (5):

$$-1.30 \leq f1/fG2 \leq -1.00 \quad (5).$$

4. The zoom lens according to claim 1, wherein a focal length of the second lens is denoted as f2, a focal length of the third lens is denoted as f3, and the zoom satisfies a following relationship (6):

$$-1.75 \leq f3/f2 \leq -1.35 \quad (6).$$

5. The zoom lens according to claim 1, wherein a focal length of the second lens is denoted as f2, a focal length of the fourth lens is denoted as f4, and the zoom lens satisfies a following relationship (7):

$$-1.75 \leq f4/f2 \leq -1.35 \quad (7).$$

6. The zoom lens according to claim 1, wherein a focal length of the fifth lens is denoted as f5, a combined focal length of the second lens group is denoted as fG2, and the zoom lens satisfies a following relationship (8):

$$0.30 \leq f5/fG2 \leq 0.40 \quad (8).$$

7. The zoom lens according to claim 1, wherein a focal length of the sixth lens is denoted as f6, a combined focal length of the second lens group is denoted as fG2, and the zoom lens satisfies a following relationship (9):

$$-1.50 \leq f6/fG2 \leq -1.00 \tag{9}$$

8. The zoom lens according to claim 1, wherein the first lens is made of a glass material.

* * * * *